US008103442B2

(12) United States Patent
Akita et al.

(10) Patent No.: US 8,103,442 B2
(45) Date of Patent: Jan. 24, 2012

(54) NAVIGATION DEVICE AND ITS METHOD

(75) Inventors: Takashi Akita, Osaka (JP); Takahiro Kudoh, Osaka (JP); Tsuyoshi Kindo, Osaka (JP)

(73) Assignee: Panasonic Corporation, Osaka (JP)

( * ) Notice: Subject to any disclaimer, the term of this patent is extended or adjusted under 35 U.S.C. 154(b) by 730 days.

(21) Appl. No.: 12/297,515

(22) PCT Filed: Apr. 28, 2006

(86) PCT No.: PCT/JP2006/309019
§ 371 (c)(1),
(2), (4) Date: Oct. 17, 2008

(87) PCT Pub. No.: WO2007/129382
PCT Pub. Date: Nov. 15, 2007

(65) Prior Publication Data
US 2009/0132161 A1 May 21, 2009

(51) Int. Cl.
G01C 21/00 (2006.01)
(52) U.S. Cl. .................................................. 701/201
(58) Field of Classification Search .......... 701/200, 701/201, 207, 208, 209, 210
See application file for complete search history.

(56) References Cited

U.S. PATENT DOCUMENTS

| 6,249,720 B1 * | 6/2001 | Kubota et al. ...................... 701/1 |
| 6,401,029 B1 * | 6/2002 | Kubota et al. ................. 701/201 |
| 7,822,539 B2 * | 10/2010 | Akiyoshi et al. ............. 701/201 |
| 8,000,897 B2 * | 8/2011 | Breed et al. ................... 701/301 |
| 2003/0214576 A1 | 11/2003 | Koga |
| 2004/0199303 A1 * | 10/2004 | Ohmura et al. ................. 701/5 |
| 2008/0192984 A1 * | 8/2008 | Higuchi et al. .............. 382/104 |
| 2008/0228394 A1 * | 9/2008 | Fukuda et al. ............... 701/208 |
| 2009/0027399 A1 * | 1/2009 | Sato et al. ..................... 345/467 |
| 2011/0106428 A1 * | 5/2011 | Park et al. .................... 701/201 |

FOREIGN PATENT DOCUMENTS

| EP | 1 659 368 | 5/2006 |
| JP | 5-216396 | 8/1993 |
| JP | 7-63572 | 3/1995 |
| JP | 7-225126 | 8/1995 |
| JP | 7-318650 | 12/1995 |

(Continued)

OTHER PUBLICATIONS

Partial English Translation of JP H07-63572 published Mar. 1995.

(Continued)

Primary Examiner — Faye M. Fleming
(74) Attorney, Agent, or Firm — Wenderoth, Lind & Ponack, L.L.P.

(57) ABSTRACT

In a navigation device for providing a guide from an origin to a destination, a display section displays a guide image indicating the guide to the destination. A state acquisition section acquires a state outside a vehicle. A photographed guide generation section generates a photographed guide image, using a photographed image of a captured forward direction of the vehicle. A map guide generation section generates a map guide image, using map information. Based on the state outside the vehicle acquired by the state acquisition section, a state determination section determines which one of the photographed guide image and the map guide image is to be displayed by priority. Based on the determination made by the state determination section, a guide display control section allows the guide image including at least one of the photographed guide image and the map guide image to be displayed in the display section.

23 Claims, 26 Drawing Sheets

FOREIGN PATENT DOCUMENTS

| | | |
|---|---|---|
| JP | 11-023305 | 1/1999 |
| JP | 11-108684 | 4/1999 |
| JP | 11-249556 | 9/1999 |
| JP | 2000-205881 | 7/2000 |
| JP | 2002-048565 | 2/2002 |
| JP | 2002-304117 | 10/2002 |
| JP | 2003-333586 | 11/2003 |
| JP | 2005-077214 | 3/2005 |
| JP | 2005-229529 | 8/2005 |
| JP | 2005-249504 | 9/2005 |
| JP | 2006-021632 | 1/2006 |
| JP | 2006-044554 | 2/2006 |
| WO | 2005/079060 | 8/2005 |

OTHER PUBLICATIONS

Partial English Translation of JP 2002-48565 published Feb. 2002.
International Search Report mailed Aug. 1, 2006 for International Application No. PCT/JP2006/309019.

* cited by examiner

F I G. 2 A

| NODE ID | ATTRIBUTE | VALUE |
|---|---|---|
| Node1 | LATITUDE | N1 |
| | LONGITUDE | E1 |
| | NUMBER OF CONNECTED LINKS | 4 |
| | CONNECTED LINK ID | L1, L3, L8, L12 |
| ⋮ | ⋮ | ⋮ |

FIG. 2B

| NODE ID | ATTRIBUTE | VALUE |
|---|---|---|
| CN1 | LATITUDE | N2 |
| | LONGITUDE | E2 |
| | EXISTENCE LINK ID | L1 |
| ... | ... | ... |

FIG. 2C

| LINK ID | ATTRIBUTE | VALUE |
|---|---|---|
| L1 | STARTING-POINT NODE | Node1 |
| | END-POINT NODE | Node5 |
| | LINK LENGTH | 700 |
| | TYPE | GENERAL ROAD |
| | ROAD WIDTH | 10m |
| | NUMBER OF INTERPOLATION NODES | 2 |
| | INTERPOLATION NODE ID [1] | CN1 |
| | INTERPOLATION NODE ID [2] | CN2 |
| ... | ... | ... |

F I G. 14A

| STATE | DETERMINATION CONDITION | DETERMINATION RESULT |
|---|---|---|
| DEGREE OF BLOCKING CAUSED BY FORWARD VEHICLE, ETC. IN PHOTOGRAPHED IMAGE OF CAPTURED FORWARD DIRECTION OF VEHICLE | COMPARISON WITH THRESHOLD (PHOTOGRAPHED PRIORITY IF LESS THAN THRESHOLD) | PHOTOGRAPHED PRIORITY |
| GUIDE TARGET INTERSECTION | DETERMINATION OF PRESENCE OR ABSENCE IN CAPTURE RANGE (PHOTOGRAPHED PRIORITY IF PRESENT IN CAPTURE RANGE) | PHOTOGRAPHED PRIORITY |
| BRIGHTNESS OUTSIDE VEHICLE | COMPARISON WITH THRESHOLD (PHOTOGRAPHED PRIORITY IF MORE THAN THRESHOLD) | PHOTOGRAPHED PRIORITY |
| WEATHER (PRECIPITATION, FOG) | PRESENCE OR ABSENCE OF RAINFALL, SNOWFALL, AND/OR FOG (PHOTOGRAPHED PRIORITY IF ABSENT) | PHOTOGRAPHED PRIORITY |

F I G. 14B

| STATE | DETERMINATION CONDITION | DETERMINATION RESULT |
|---|---|---|
| DEGREE OF BLOCKING CAUSED BY PRECEDING VEHICLE, ETC. IN PHOTOGRAPHED IMAGE OF CAPTURED FORWARD DIRECTION OF VEHICLE | COMPARISON WITH THRESHOLD (PHOTOGRAPHED PRIORITY IF LESS THAN THRESHOLD) | MAP PRIORITY |
| GUIDE TARGET INTERSECTION | DETERMINATION OF PRESENCE OR ABSENCE IN CAPTURE RANGE (PHOTOGRAPHED PRIORITY IF PRESENT IN CAPTURE RANGE) | PHOTOGRAPHED PRIORITY |
| BRIGHTNESS OUTSIDE VEHICLE | COMPARISON WITH THRESHOLD (PHOTOGRAPHED PRIORITY IF MORE THAN THRESHOLD) | PHOTOGRAPHED PRIORITY |
| WEATHER (PRECIPITATION, FOG) | PRESENCE OR ABSENCE OF RAINFALL, SNOWFALL, AND/OR FOG (PHOTOGRAPHED PRIORITY IF ABSENT) | PHOTOGRAPHED PRIORITY |

F I G. 1 5

| STATE | DETERMINATION CONDITION | DETERMINATION RESULT | POINT | |
|---|---|---|---|---|
| | | | PHOTOGRAPHED | MAP |
| DEGREE OF BLOCKING CAUSED BY PRECEDING VEHICLE, ETC. IN PHOTOGRAPHED IMAGE OF CAPTURED FORWARD DIRECTION OF VEHICLE | COMPARISON WITH THRESHOLD (PHOTOGRAPHED PRIORITY IF LESS THAN THRESHOLD) | PHOTOGRAPHED PRIORITY | 30 | |
| GUIDE TARGET INTERSECTION | DETERMINATION OF PRESENCE OR ABSENCE IN CAPTURE RANGE (PHOTOGRAPHED PRIORITY IF PRESENT IN CAPTURE RANGE) | PHOTOGRAPHED PRIORITY | | 20 |
| BRIGHTNESS OUTSIDE VEHICLE | COMPARISON WITH THRESHOLD (PHOTOGRAPHED PRIORITY IF MORE THAN THRESHOLD) | PHOTOGRAPHED PRIORITY | 20 | |
| WEATHER (PRECIPITATION, FOG) | PRESENCE OR ABSENCE OF RAINFALL, SNOWFALL, AND/OR FOG (PHOTOGRAPHED PRIORITY IF ABSENT) | PHOTOGRAPHED PRIORITY | | 10 |
| TOTAL | | | 50 | 30 |

F I G. 19

| STATE | DETERMINATION CONDITION | GUIDE IMAGES TO SWITCH | DETERMINATION RESULT |
|---|---|---|---|
| DEGREE OF BLOCKING CAUSED BY PRECEDING VEHICLE, ETC. IN PHOTOGRAPHED IMAGE OF CAPTURED FORWARD DIRECTION OF VEHICLE | COMPARISON WITH THRESHOLD (PHOTOGRAPHED PRIORITY IF LESS THAN THRESHOLD) | PHOTOGRAPHED/MAP | PHOTOGRAPHED PRIORITY |
| GUIDE TARGET INTERSECTION | DETERMINATION OF PRESENCE OR ABSENCE IN CAPTURE RANGE (PHOTOGRAPHED PRIORITY A IF PRESENT IN CAPTURE RANGE) | PHOTOGRAPHED A /PHOTOGRAPHED B | PHOTOGRAPHED B PRIORITY |
| BRIGHTNESS OUTSIDE VEHICLE | COMPARISON WITH THRESHOLD (PHOTOGRAPHED PRIORITY IF MORE THAN THRESHOLD) | PHOTOGRAPHED/MAP | PHOTOGRAPHED PRIORITY |
| WEATHER (PRECIPITATION, FOG) | PRESENCE OR ABSENCE OF RAINFALL, SNOWFALL, AND/OR FOG (PHOTOGRAPHED PRIORITY IF ABSENT) | PHOTOGRAPHED/MAP | PHOTOGRAPHED PRIORITY |

NAVIGATION DEVICE AND ITS METHOD

TECHNICAL FIELD

The present invention relates to a navigation device, and particularly to a navigation device for providing a guide from an origin to a destination, with the use of a map image using map information or a photographed image captured by a camera or the like, and its method.

BACKGROUND ART

In recent years, a navigation device for, with the use of map information, displaying a map image of the vicinity of the position of a vehicle in an in-vehicle display, and for, when a destination is set, searching for a route from the current position to the destination and then guiding the vehicle to the destination along the route searched for, is widely used. Specifically, the navigation device displays the route searched for in a color different from those of other roads, or displays the route searched for, increasing the widths of its roads in the display. Consequently, the user can distinguish the route searched for from other roads. Further, when the vehicle reaches a predetermined distance away from a guide target intersection, such as an intersection at which it is necessary to turn, a guide map (e.g., a close-up of the intersection) of the guide target intersection is displayed. As a result, the user can comprehend the direction for the vehicle to travel from the guide target intersection on the route.

Further, it is disclosed that it is possible, as desired by the user, to select guide image display (a photographed guide) for guiding the vehicle to the destination by superimposing a guide figure (a figure such as an arrow, etc., indicating the direction for the vehicle to travel from the guide target intersection) on a photographed image showing the view outside the vehicle, captured by a vehicle-mounted camera, or guide image display (a map guide) using map information (see Patent Document 1, for example). Patent Document 1: Japanese Laid-Open Patent Publication No. 7-63572

SUMMARY OF THE INVENTION

Problems to be Solved by the Invention

However, in the conventional in-vehicle navigation device disclosed in Patent Document 1, when the vehicle is guided using the guide image in which the photographed image has the guide figure superimposed thereon, the guide image in which the photographed image has the guide figure superimposed thereon may be difficult for the user to understand, depending on the state outside the vehicle at the time. For example, the photographed image showing the view of the forward direction of the vehicle may be blocked by an obstacle such as a forward vehicle. Alternatively, the road in the forward direction of the vehicle may curve or slope insomuch that the photographed image showing the captured view of the forward direction of the vehicle does not include the guide target intersection. Yet alternatively, the view of the forward direction of the vehicle may not be clearly captured at night or in rain. In these cases, it is difficult to understand which road or intersection is indicated by the guide figure, and as a result, the user may falsely recognize the intersection at which the user should turn. Further, the user is required to perform a troublesome operation of switching which one of the guide image (the map guide) using map information and the guide image (the photographed guide) in which the photographed image has the guide figure superimposed thereon is to be displayed.

Therefore, an object of the present invention is to provide a navigation device capable of automatically switching between the map image using map information and the photographed image showing the view outside the vehicle, to be displayed by priority, and its method.

Solution to the Problems

The object of the present invention is attained by a navigation device having the following features.

The present invention includes: a display section for displaying a guide image indicating a guide to a destination; a state acquisition section for acquiring a state outside a vehicle; a photographed guide generation section for generating a photographed guide image, using a photographed image of a captured forward direction of the vehicle; a map guide generation section for generating a map guide image, using map information; a state determination section for, based on the state outside the vehicle acquired by the state acquisition section, determining which one of the photographed guide image and the map guide image is to be displayed by priority; and a guide display control section for, based on the determination made by the state determination section, allowing the guide image including at least one of the photographed guide image and the map guide image to be displayed in the display section.

Further, the state acquisition section acquires a plurality of the states outside the vehicle. When the state determination section determines, based on at least one of the states outside the vehicle acquired by the state acquisition section, that the map guide image is to be displayed by priority, the guide display control section may allow the map guide image to be displayed by priority.

Further, based on the determination made by the state determination section, the guide display control section may allow either one of the photographed guide image and the map guide image to be displayed.

Further, based on the determination made by the state determination section, the guide display control section may allow either one of the photographed guide image and the map guide image to be displayed relatively large.

Consequently, the navigation device can control, in accordance with the state outside the vehicle, which one of the map guide image and the photographed guide image is to be displayed by priority. Therefore, it is possible to automatically switch the guide image and display the guide image having high visibility in accordance with the state outside the vehicle, without the user performing a switch operation.

Further, until a predetermined time has elapsed since the guide image displayed by priority has switched, the guide display control section may no longer switch the guide image displayed by priority.

Consequently, until the predetermined time has elapsed, the navigation device can no longer switch the guide image displayed by priority. As a result, since the guide image does not frequently switch, it is possible to prevent the user from being confused.

Further, until the vehicle has traveled a predetermined distance since the guide image displayed by priority has switched, the guide display control section may no longer switch the guide image displayed by priority.

Consequently, until the vehicle has traveled the predetermined distance, the navigation device can no longer switch the guide image displayed by priority. As a result, since the guide image does not frequently switch, it is possible to prevent the user from being confused.

Further, while the vehicle is traveling a predetermined section, the guide display control section may no longer switch the guide image displayed by priority.

Consequently, since the guide image does not frequently switch in a section (e.g., away from a guide target intersection) where the user frequently views a guide screen, it is possible to prevent the user from being confused.

Further, the state acquisition section may acquire the state outside the vehicle from the photographed image.

Further, the state acquisition section includes a degree-of-blocking calculation section for calculating a degree of blocking caused by an obstacle in a forward direction of the vehicle in the photographed image. Still further, based on the degree of blocking calculated by the degree-of-blocking calculation section, the state determination section may determine which one of the photographed guide image and the map guide image is to be displayed by priority. Furthermore, the state determination section may determine, when the degree of blocking calculated by the degree-of-blocking calculation section is less than a threshold, that the photographed guide image is to be displayed by priority, and may also determine, when the degree of blocking calculated by the degree-of-blocking calculation section is more than the threshold, that the map guide image is to be displayed by priority. Note that the degree-of-blocking calculation section may calculate, in the photographed image, a proportion of a region overlapping the obstacle in the forward direction to an intersection region which is a region in which a guide target intersection is displayed, as the degree of blocking.

Consequently, the navigation device can calculate the degree of blocking caused by an obstacle in the forward direction of the vehicle in the photographed image of the captured forward direction of the vehicle, and can determine, in accordance with the calculated degree of blocking, which one of the map guide image and the photographed guide image is to be displayed by priority.

Further, when it is possible to view the forward direction of the vehicle in the photographed image of the captured forward direction of the vehicle, it is possible to determine that the photographed guide image is to be displayed by priority. On the other hand, when it is impossible to view the forward direction of the vehicle in the photographed image of the captured forward direction of the vehicle, it is possible to determine that the map guide image is to be displayed by priority. As a result, since the guide image corresponding to the state outside the vehicle is displayed, the visibility of the guide image is improved.

Further, the state acquisition section includes a guide target intersection determination section for determining whether or not the whole or part of an intersection region which is a region in which a guide target intersection is displayed is present in the photographed image. Note that the intersection region is a region including the guide target intersection and a predetermined range around the guide target intersection. Still further, based on the determination made by the guide target intersection determination section, the state determination section may determine which one of the photographed guide image and the map guide image is to be displayed by priority. Furthermore, the state determination section may determine, when the guide target intersection determination section determines that the whole or part of an intersection region which is a region in which a guide target intersection is displayed is present in the photographed image, that the photographed guide image is to be displayed by priority, and may also determine, when the guide target intersection determination section determines that the whole or part of the region the intersection region which is a region in which a guide target intersection is displayed is not present in the photographed image, that the map guide image is to be displayed by priority.

Consequently, by determining the presence or absence, in the photographed image, of the whole or part of the intersection region which is a region in which a guide target intersection is displayed, the navigation device can determine which one of the map guide image and the photographed guide image is to be displayed by priority. Further, when the whole or part of the intersection region which is a region in which a guide target intersection is displayed appears in a guide screen, it is possible to determine that the photographed guide image is to be displayed by priority. On the other hand, when the whole or part of the intersection region which is a region in which a guide target intersection is displayed does not appear in the guide screen, it is possible to determine that the map guide image is to be displayed by priority. As a result, since the guide image corresponding to the state outside the vehicle is displayed, the visibility of the guide image is improved.

Further, the state acquisition section includes a brightness acquisition section for acquiring a brightness outside the vehicle. Still further, based on the brightness acquired by the brightness acquisition section, the state determination section may determine which one of the photographed guide image and the map guide image is to be displayed by priority. Furthermore, the state determination section may determine, when the brightness acquired by the brightness acquisition section is more than a threshold, that the photographed guide image is to be displayed by priority, and may also determine, when the brightness acquired by the brightness acquisition section is less than the threshold, that the map guide image is to be displayed by priority.

Consequently, the navigation device can determine, in accordance with the brightness outside the vehicle, which one of the map guide image and the photographed guide image is to be displayed by priority. Further, when it is bright outside the vehicle, such as in the daytime, it is possible to determine that the photographed guide image is to be displayed by priority. On the other hand, when it is dark outside the vehicle, such as at night or in a tunnel, it is possible to determine that the map guide image is to be displayed by priority. As a result, since the guide image corresponding to the state outside the vehicle is displayed, the visibility of the guide image is improved.

Further, the state acquisition section includes a precipitation detection section for detecting precipitation outside the vehicle. Still further, based on the detection result of the precipitation detection section, the state determination section may determine which one of the photographed guide image and the map guide image is to be displayed by priority. Furthermore, the state determination section may determine, when the precipitation detection section does not detect precipitation, that the photographed guide image is to be displayed by priority, and may also determine, when the precipitation detection section detects precipitation, that the map guide image is to be displayed by priority.

Consequently, the navigation device can determine, in accordance with the detection result of precipitation outside the vehicle, which one of the map guide image and the photographed guide image is to be displayed by priority. Further, when it is not raining, it is possible to determine that the photographed guide image is to be displayed by priority. On the other hand, when it is raining, since the view outside the vehicle cannot be clearly displayed, it is possible to determine that the map guide image is to be displayed by priority. As a result, since the guide image corresponding to the state outside the vehicle is displayed, the visibility of the guide image is improved.

Further, the state acquisition section includes a fog detection section for detecting fog outside the vehicle. Still further, based on the detection result of the fog detection section, the state determination section may determine which one of the photographed guide image and the map guide image is to be displayed by priority. Furthermore, the state determination section may determine, when the fog detection section does not detect fog, that the photographed guide image is to be displayed by priority, and may also determine, when the fog detection section detects fog, that the map guide image is to be displayed by priority.

Consequently, the navigation device can determine, in accordance with the detection result of fog outside the vehicle, which one of the map guide image and the photographed guide image is to be displayed by priority. Further, when fog is not occurring, it is possible to determine that the photographed guide image is to be displayed by priority. On the other hand, when fog is occurring, since the view outside the vehicle cannot be clearly displayed, it is possible to determine that the map guide image is to be displayed by priority. As a result, since the guide image corresponding to the state outside the vehicle is displayed, the visibility of the guide image is improved.

Further, the state acquisition section includes a distance measurement section for measuring a distance to a forward vehicle. Still further, based on the distance measured by the distance measurement section, the state determination section may determine which one of the photographed guide image and the map guide image is to be displayed by priority. Furthermore, the state determination section may determine, when the distance measured by the distance measurement section is more than a threshold, that the photographed guide image is to be displayed by priority, and may also determine, when the distance measured by the distance measurement section is less than the threshold, that the map guide image is to be displayed by priority.

Consequently, the navigation device can measure the distance to a forward vehicle based on whether or not it is possible to view the forward direction of the vehicle, and can determine, in accordance with the measured distance, which one of the map guide image and the photographed guide image is to be displayed by priority. Further, when the measured distance is more than the threshold, since the distance between these two vehicles is so long that it is possible to view the forward direction of the vehicle, it is possible to determine that the photographed guide image is to be displayed by priority. On the other hand, when the measured distance is less than the threshold, since the distance between these two vehicles is so short that it is impossible to view the forward direction of the vehicle, it is possible to determine that the map guide image is to be displayed by priority. As a result, since the guide image corresponding to the state outside the vehicle is displayed, the visibility of the guide image is improved.

Further, the state acquisition section includes a vibration detection section for detecting a vibration of a capture section for capturing the forward direction of the vehicle. Still further, based on the detection result of the vibration detection section, the state determination section may determine which one of the photographed guide image and the map guide image is to be displayed by priority. Furthermore, the state determination section may determine, when an amplitude of the vibration detected by the vibration detection section is less than a threshold, that the photographed guide image is to be displayed by priority, and may also determine, when the amplitude of the vibration detected by the vibration detection section is more than the threshold, that the map guide image is to be displayed by priority.

Consequently, the navigation device can determine, in accordance with the detection result of a vibration of the capture section for capturing the forward direction of the vehicle, which one of the map guide image and the photographed guide image is to be displayed by priority. Further, when the surface of a road being traveled is quite uneven and the amplitude of the detected vibration is less than the threshold, since the visibility of the photographed image is low due to the vibration of the photographed image, it is possible to determine that the map guide image is to be displayed by priority. On the other hand, when the amplitude of the detected vibration is more than the threshold, since the vibration of the photographed image is small, it is possible to determine that the photographed guide image is to be displayed by priority. As a result, since the guide image corresponding to the state outside the vehicle is displayed, the visibility of the guide image is improved.

Further, the state acquisition section includes a road attribute acquisition section for acquiring an attribute of a road being traveled. Furthermore, based on the attribute acquired by the road attribute acquisition section, the state determination section may determine which one of the photographed guide image and the map guide image is to be displayed by priority.

Consequently, the navigation device can determine, in accordance with the attribute of the road, which one of the map guide image and the photographed guide image is to be displayed by priority. As a result, since the guide image corresponding to the state outside the vehicle is displayed, the visibility of the guide image is improved.

Further, the state acquisition section includes a guide object detection section for detecting a marker guide object around a guide target intersection. Furthermore, based on the detection result of the guide object detection section, the state determination section may determine which one of the photographed guide image and the map guide image is to be displayed by priority.

Consequently, the navigation device can determine, in accordance with the detection result of a marker guide object around the guide target intersection, which one of the map guide image and the photographed guide image is to be displayed by priority. As a result, since the guide image corresponding to the state outside the vehicle is displayed, the visibility of the guide image is improved.

Further, the photographed guide generation section may generate the photographed guide image varying in display mode depending on the state outside the vehicle acquired by the state acquisition section.

Further, the state acquisition section includes a guide target intersection determination section for determining whether or not the whole or part of an intersection region which is a region in which a guide target intersection is displayed is present in the photographed image. Furthermore, the photographed guide generation section may generate the photographed guide image by superimposing, on the photographed image, a guide figure varying in form depending on the determination made by the guide target intersection determination section.

Consequently, when the photographed guide image is displayed by priority, the navigation device can generate the photographed guide image having superimposed thereon the guide figure varying in form, by determining the presence or absence, in the photographed image, of the whole or part of the intersection region which is a region in which a guide target intersection is displayed. As a result, even when the guide target intersection is absent in the photographed image, it is possible to display the photographed guide image having high visibility and using the photographed image for allowing the user to intuitively confirm the situation.

The object of the present invention is attained by a navigation method having the following steps. The present invention includes: a state acquisition step of acquiring a state outside a vehicle; a photographed guide generation step of generating a photographed guide image, using a photographed image of a captured forward direction of the vehicle; a map guide generation step of generating a map guide image, using map information; a state determination step of, based on the state outside the vehicle acquired in the state acquisition step, determining which one of the photographed guide image and the map guide image is to be displayed by priority; and a guide display control step of, based on the determination made in the state determination step, allowing a guide image including at least one of the photographed guide image and the map guide image to be displayed.

Consequently, the navigation method can control, in accordance with the state outside the vehicle, which one of the map guide image and the photographed guide image is to be displayed by priority. Therefore, it is possible to automatically switch the guide image and display the guide image having high visibility in accordance with the state outside the vehicle, without the user performing a switch operation.

EFFECT OF THE INVENTION

According to the present invention, as is clear from the above descriptions, which one of the map guide image and the photographed guide image is to be displayed by priority is controlled in accordance with the state outside the vehicle. Consequently, it is possible to automatically switch the guide image and display the guide image having high visibility in accordance with the state outside the vehicle, without the user performing a switch operation.

BRIEF DESCRIPTION OF THE DRAWINGS

FIG. 2A is a diagram showing an example of node data included in map information stored in a map DB 3 according to the first embodiment.

FIG. 2B is a diagram showing an example of interpolation data interpolation node data included in the map information stored in the map DB 3 according to the first embodiment.

FIG. 2C is a diagram showing an example of link data included in the map information stored in the map DB 3 according to the first embodiment.

FIG. 14A is a diagram showing an example of the determination condition and the determination result of each of a plurality of states outside the vehicle.

FIG. 14B is a diagram showing an example of the determination condition and the determination result of each of the plurality of states outside the vehicle.

FIG. 15 is a diagram showing an example of the determination condition, the determination result, and the weighted points of each of the plurality of states outside the vehicle, and total points.

FIG. 19 is an example of the guide images to switch, the determination condition, and the determination result of each of a plurality of states outside the vehicle.

Figure 1:
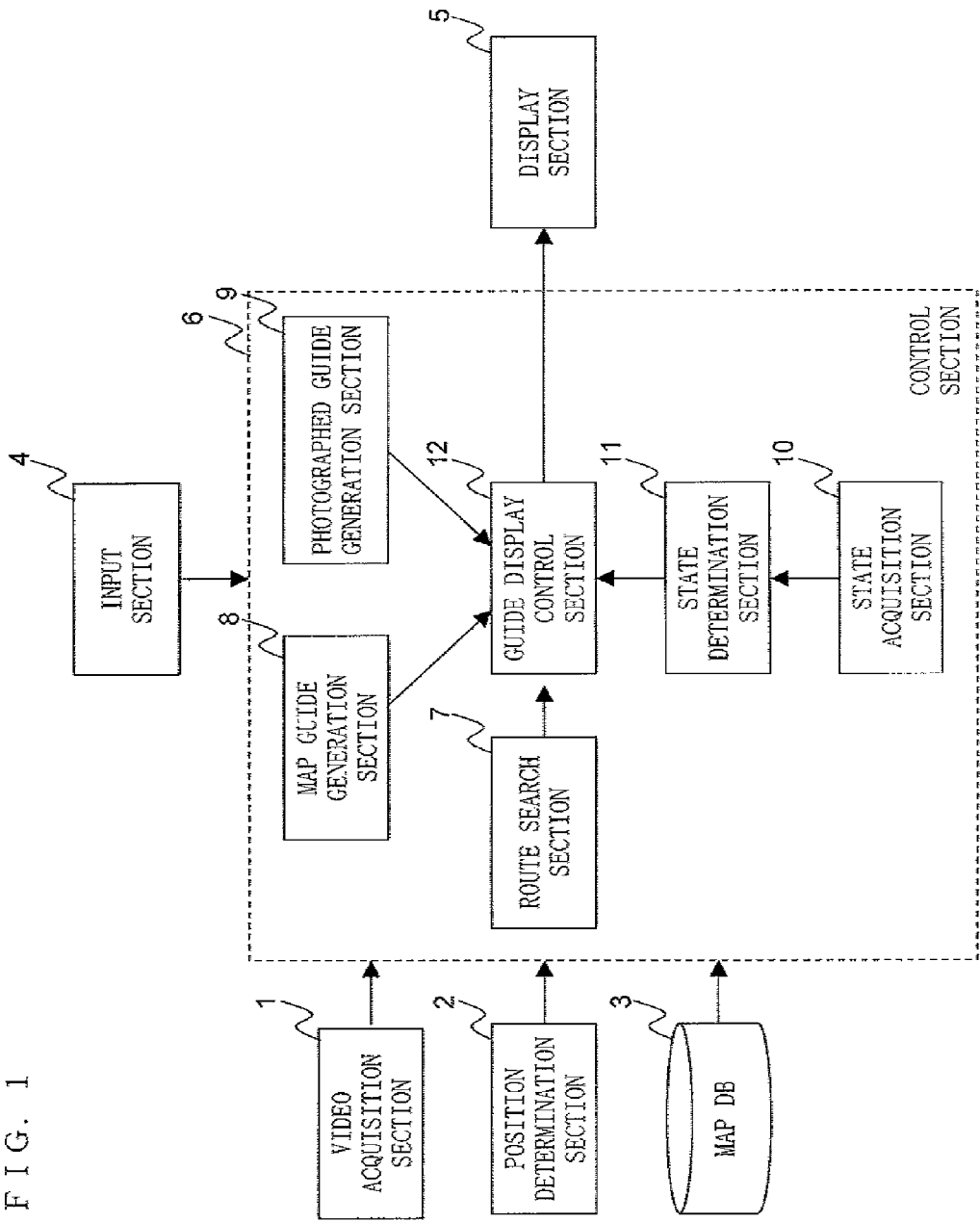
FIG. 1 is a functional block diagram showing the structure of a navigation device according to a first embodiment.

DESCRIPTION OF THE REFERENCE CHARACTERS 1 video acquisition section
2 position determination section
3 map DB 4 input section
5 display section
6 control section
7 route search section
8 map guide generation section
9 photographed guide generation section
10 state acquisition section
11 state determination section
12 guide display control section

DETAILED DESCRIPTION OF THE INVENTION

First Embodiment

With reference to FIG. 1, a navigation device according to a first embodiment of the present invention will be described. Note that FIG. 1 is a functional block diagram showing the structure of the navigation device according to the first embodiment. Note that elements irrelevant to the present invention are not shown in the figures.

Referring to FIG. 1, the navigation device includes a video acquisition section 1, a position determination section 2, a map DB 3, an input section 4, a display section 5, and a control section 6.

The video acquisition section 1 acquires an image captured by a camera using, for example, a CCD (Charge-Coupled Device) or a CMOS (Complementary Metal-Oxide Semiconductor). The camera for acquiring the image is installed at the ceiling of a vehicle, the front end of the vehicle, the back of a rear view mirror, or the like, and preferably captures the forward direction of the vehicle. Note that when capturing the outside of the vehicle, the camera may capture not only the forward direction of the vehicle but also the left/right directions and the backward direction of the vehicle.

The position determination section 2 measures the current position, the speed, and the orientation of the vehicle. The position determination section 2 may be, for example, a GNSS (Global Navigation Satellite System) receiver, a vehicle speed sensor, and a gyro sensor. The GNSS receiver may be, for example, a GPS (Global Positioning System) receiver, and receives radio waves from a satellite and then calculates the position of the receiver by demodulating the received radio waves.

The map DB 3 may include, for example, an HDD (Hard Disc Drive) or a DVD (Digital Versatile Disc). The map DB 3 has stored therein map information such as road shape data and intersection position data in advance. Note, however, that the present invention is not limited thereto, and the map information may be appropriately downloaded from a traffic information center via communication means (e.g., a mobile phone), not shown in the figures, and stored in the map DB 3.

Here, with reference to FIGS. 2A, 2B, and 2C, the map information stored in the map DB 3 will be described. The map DB 3 may have stored therein, for example, node data, interpolation node data, and link data. Note that FIGS. 2A, 2B, and 2C are diagrams each showing an example of the map information excerpted in part from the map information related to the present embodiment, included in the map information stored in the map DB 3.

FIG. 2A is the node data, regarding a point (a node) at which a road branches in multiple directions, such as an intersection or a merging point. The node data, on a node-by-node basis, includes position information regarding the latitude and the longitude of the node, the number of links connected to the node, and the IDs of the links. FIG. 2B is the interpolation node data, regarding a turn off point that exists on a link so as to represent the shape of the link when the link is not linear, for example. The interpolation node data, on an interpolation-node-by-interpolation-node basis, includes position information regarding the latitude and the longitude of the interpolation node, and an existence link ID indicating the interpolation node. FIG. 2C is the link data, regarding a road connecting a node to another node. The link data, on a link-by-link basis, includes a starting-point node and an end-point node that are the both ends of the link, the link length (e.g., in meters, in kilometers, etc.), the road type indicating a general road, an expressway and the like, the road width, the number of the above-described interpolation nodes, and the IDs of the interpolation nodes. Note that the link data may also include the number of lanes or information regarding traffic regulations.

Figure 3:
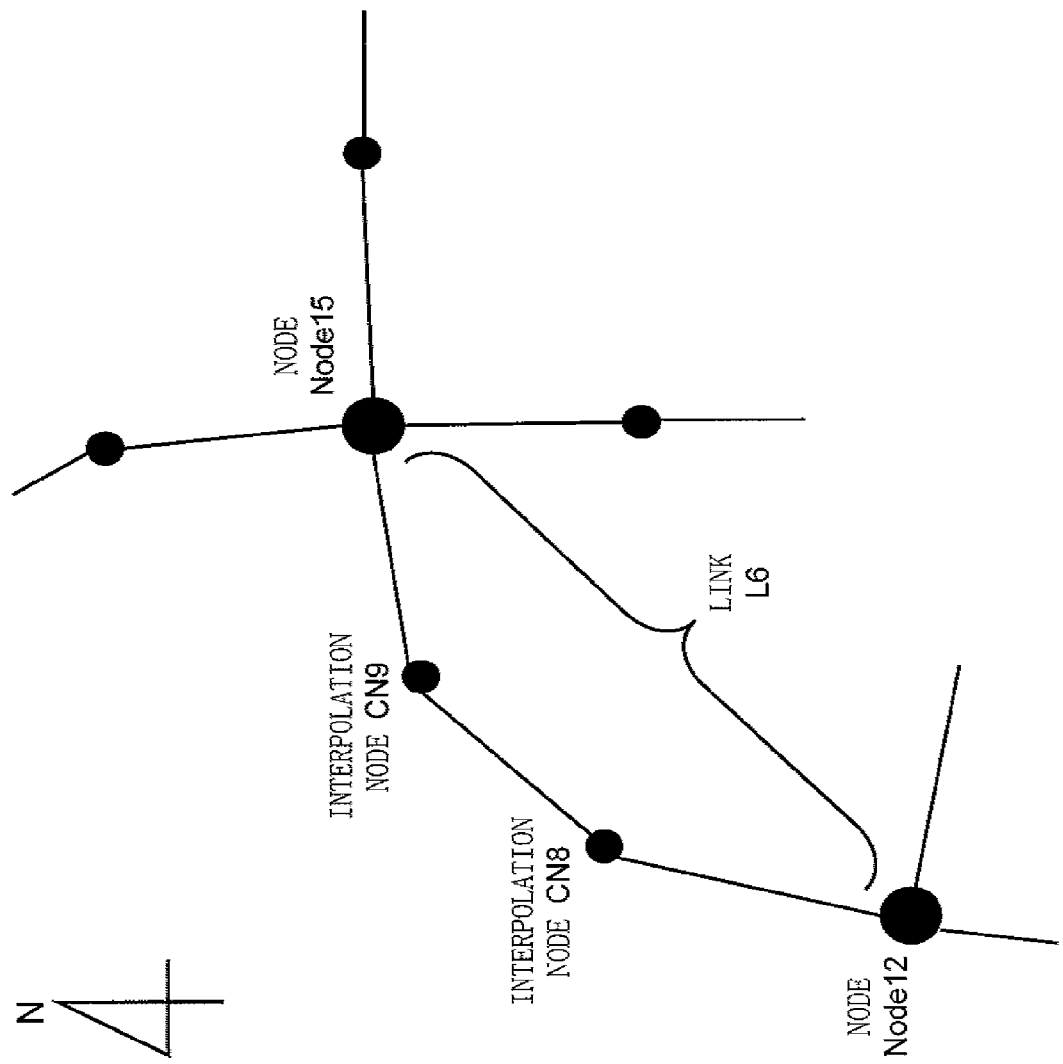
FIG. 3 is a diagram showing a structure composed of nodes and links, with the use of the node data, the interpolation node data, and the link data.

Next, with reference to FIG. 3, a structure composed of nodes and links, with the use of the node data, the interpolation node data, and the link data will be described. Note that FIG. 3 is a diagram showing an example of the structure composed of nodes and links, with the use of the node data, the interpolation node data, and the link data. Referring to FIG. 3, a node (Node15) is connected to another node (Node12) via a link L6 and also connected to three other links. Further, interpolation nodes (CN8 and CN9) exist on the link L6 to form the shape of the link. Thus a map image is formed. Note that, needless to say, no interpolation node exists on a link which is a straight road.

The input section 4 may include, for example, a remote control, a touch panel, a microphone for speech input, a speech recognition engine, and the like, and receives an instruction from the user. The instruction received from the user may be, for example, to set a destination, to select a route searched for, to start a route guide, and the like.

The display section 5 may include, for example, a display, and displays information to the user. Specifically, the display section 5 displays a guide image indicating a guide to the destination. Further, the display section 5 displays the guide image including a map guide image, generated by a map guide generation section 8 described below, and/or a photographed guide image, generated by a photographed guide generation section 9 described below.

The control section 6 may include, for example, a CPU (Central Processing Unit). Further, the control section 6 also includes a route search section 7, a map guide generation section 8, a photographed guide generation section 9, a state acquisition section 10, a state determination section 11, and a guide display control section 12.

The route search section 7 searches for an optimal route from the current position to the destination, with reference to the destination received from the input section 4, the current position of the vehicle detected by the position determination section 2, the map information stored in the map DB 3, and the like.

The map guide generation section 8 generates a guide image (herein after referred to as a map guide image) of a predetermined region, using the map information stored in the map DB 3. Here, the predetermined region is a region displayable in the display screen of the display section 5. Further, the map guide generation section 8 sets the display color of the route searched for by the route search section 7 to a color different from those of other roads, on the map image. Alternatively, the line width of the route searched for may be set to be wider than those of other roads.

The photographed guide generation section 9 generates an arrow-shaped guide figure indicating the direction for the vehicle to travel from a guide target intersection, based on the route searched for by the route search section 7, the current position of the vehicle detected by the position determination section 2, and the map information (e.g., the road shape data, etc.) stored in the map DB 3. Further, the photographed guide generation section 9 generates a guide image (herein after referred to as a photographed guide image) in which a photographed image acquired by the video acquisition section 1 has the guide figure superimposed thereon.

Figure 4:
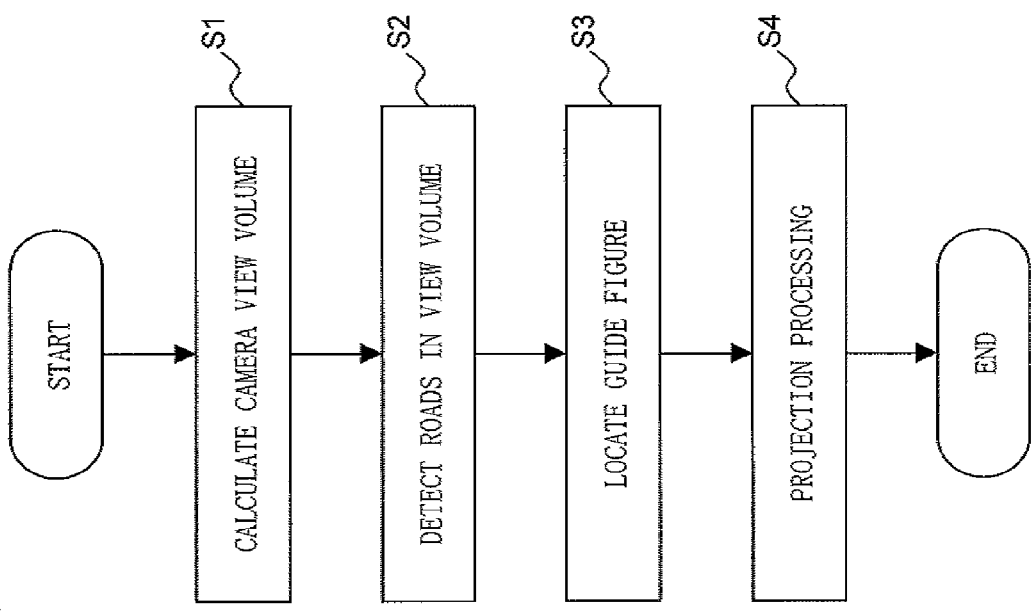
FIG. 4 is a flow chart showing the operational flow of a photographed guide generation section 9 generating a guide figure and a photographed guide image.

Here, with reference to FIGS. 4 through 8, the method of the photographed guide generation section 9 generating the guide figure and the photographed guide image will be described. Note that FIG. 4 is a flow chart showing the operational flow of the photographed guide generation section 9 generating the guide figure and the photographed guide image.

First, based on a three-dimensional map obtained from the map information stored in the map DB 3 and based also on a camera position, a camera angle (a horizontal angle and an elevation angle), a focal length, and an image size, which are parameters for determining the capture direction and the capture range of the photographed image, acquired by the video acquisition section 1 and showing the view of the forward direction of the vehicle, the photographed guide generation section 9 obtains a camera view volume in the three-dimensional map (step S1) Here, the three-dimensional map is a map represented by position information regarding latitude, longitude, and altitude. Further, the parameters for determining the capture direction and the capture range may be converted using other parameters, such as an angle of view. Furthermore, a two-dimensional map, obtained by removing the altitude information from the three-dimensional map, may be used.

Figure 5:
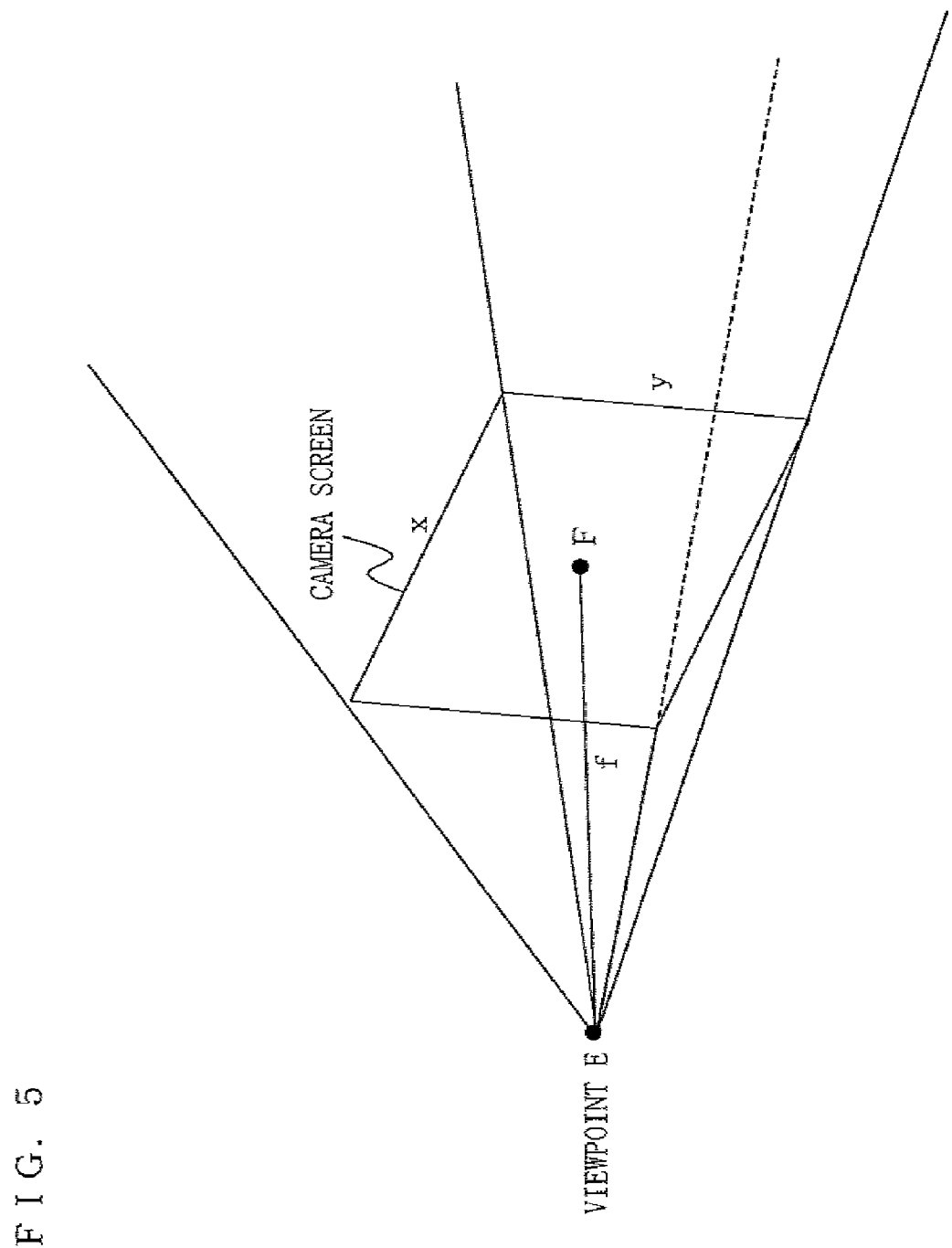
FIG. 5 is a diagram illustrating the method of obtaining a camera view volume.

The camera view volume is obtained by a method shown in FIG. 5. Note that FIG. 5 is a diagram illustrating the camera view volume. First, referring to FIG. 5, a point F, a focal length f distant from a viewpoint E (the camera position) in the direction of the camera angle, is obtained. Then, with respect to the point F, a plane (a camera screen) containing a horizontal x-axis and a vertical y-axis and having the same aspect ratio as that of the display screen of the display section 5, is set to be perpendicular to a vector connecting the viewpoint E and the point F. Next, a three-dimensional space, obtained by half lines connecting the viewpoint E and the four corner points of the camera screen, is calculated. Note that in theory, the three-dimensional space extends to an infinite distance, but is terminated at an appropriate distance from the viewpoint E, such that the resultant three-dimensional space is defined as the camera view volume.

Figure 6:
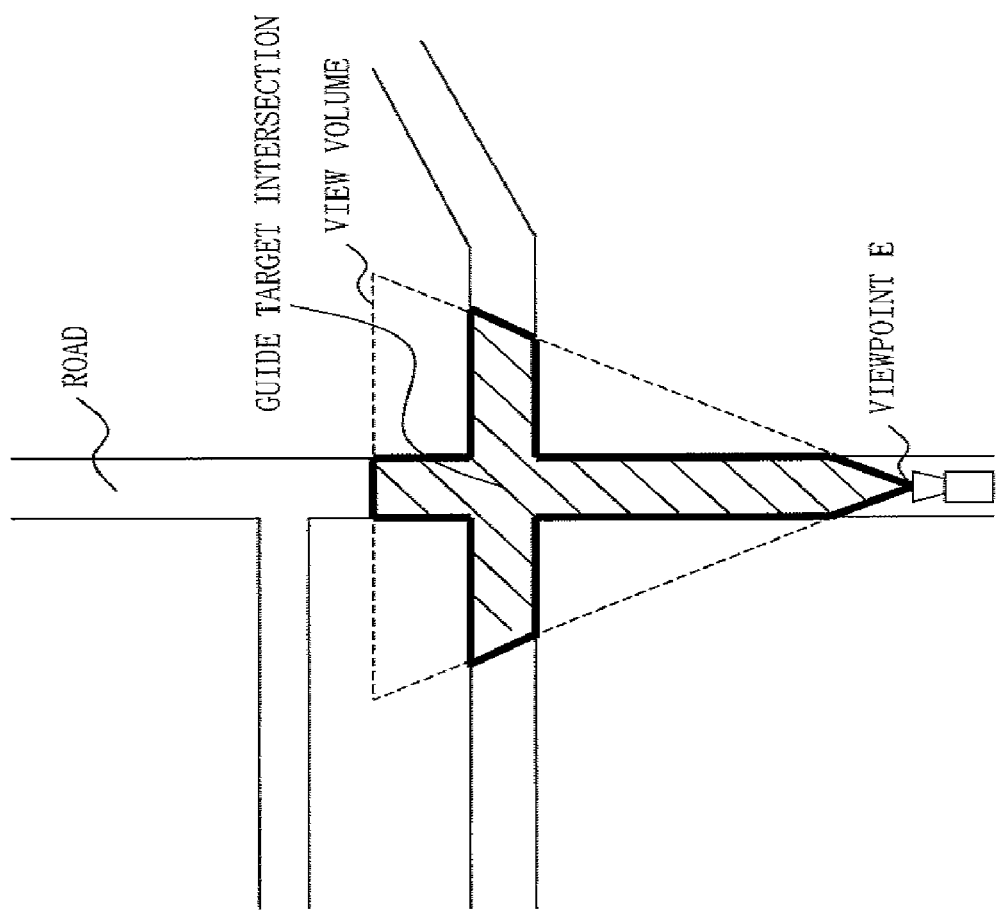
FIG. 6 is a diagram showing a three-dimensional map and the camera view volume, directed in the forward direction of a vehicle and viewed from above.

Next, in step S2, the photographed guide generation section 9 detects, in the three-dimensional map, roads present in the camera view volume obtained as described above (herein after referred to as a road detection process). Note that FIG. 6 is a diagram showing the three-dimensional map including the guide target intersection on the route searched for by the route search section 7, and also showing the camera view volume, directed in the forward direction of the vehicle and viewed from above. Specifically, as shown in FIG. 6, roads (a region represented by diagonal lines) surrounded by the camera view volume are detected as the roads present in the camera view volume. Further, in the road detection process, the road shape data, the road widths, and the like of the detected roads are extracted based on the above-described node data, interpolation node data, and link data that are stored in the map DB 3.

Figure 7:
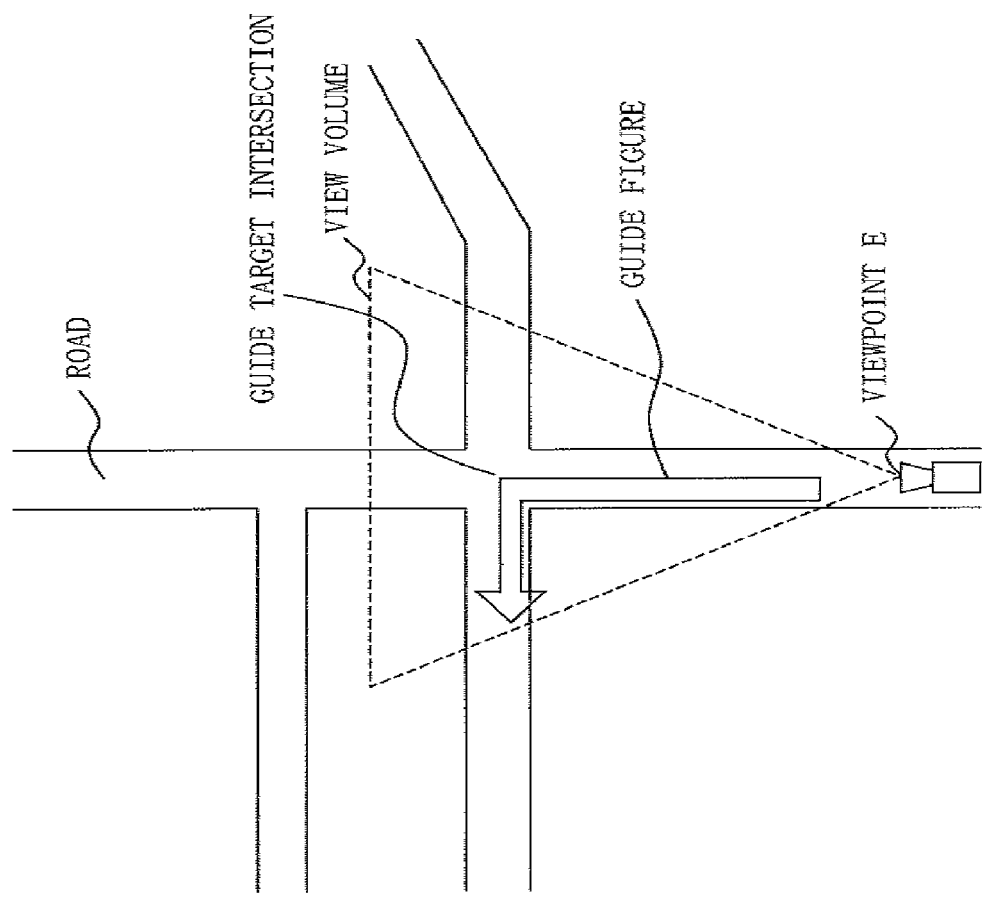
FIG. 7 is a diagram illustrating the method of obtaining the shape and the location position of the guide figure.
Figure 8:
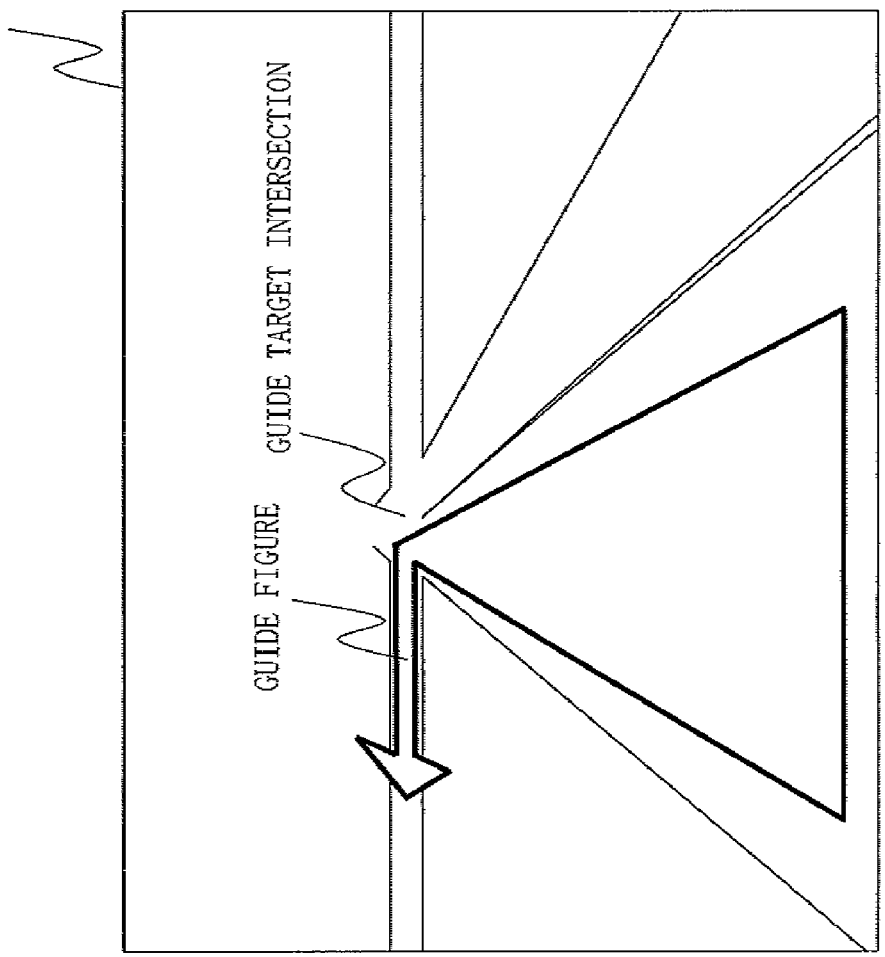
FIG. 8 is a display example of the photographed guide image according to the first embodiment.

Next, in step S3, based on the road shape data, the road widths, and the like of, among the roads detected in the road detection process, the roads corresponding to the route searched for by the route search section 7, the photographed guide generation section 9 generates the guide figure (an arrow) indicating the direction for the vehicle to travel from the guide target intersection. Note that FIG. 7 is a diagram illustrating the shape of the guide figure and the method of obtaining the location position of the guide figure. Then, as shown in FIG. 7, the generated guide figure is located on, among the roads present in the camera view volume, the roads corresponding to the route. Note that the guide figure may not be arrow-shaped as shown in FIG. 7, and may simply be a bent line.

Next, in step S4, the photographed guide generation section 9 perspective-projects the located guide figure onto the camera screen of FIG. 5, such that the camera screen is the plane of projection (projection processing). Consequently, the plane of projection, onto which the guide figure is projected, coincides with the camera screen acquired by the video acquisition section 1, and therefore the guide figure is superimposed on the roads (a guide route) displayed in the photographed image (see FIG. 8). Then, the process ends. Note that when the guide figure is superimposed on the photographed image, the superimposed position of the guide figure may be corrected by detecting the positions of the roads captured by the camera, using a well-known image recognition technique such as white line detection or road edge detection.

The state acquisition section 10 acquires states outside the vehicle. The acquired states outside the vehicle may be, for example, the degree of blocking caused by an obstacle such as a forward vehicle in the photographed image of the captured forward direction of the vehicle, the presence or absence of the guide target intersection in the photographed image of the captured forward direction of the vehicle, the brightness outside the vehicle, and precipitation (rainfall or snowfall) and/or the weather such as fog. Note that the states outside the vehicle acquired by the state acquisition section 10 will be described in detail below.

The state determination section 11 determines, with respect to each of the states outside the vehicle acquired by the state acquisition section 10, which one of the photographed guide image and the map guide image is to be displayed by priority.

Based on the determination made by the state determination section 11, the guide display control section 12 controls, with respect to each of the states outside the vehicle, which one of the photographed guide image and the map guide image is to be displayed by priority in the display section 5.

Next, with reference to FIGS. 9 through 15, the operational flow of the navigation device according to the present embodiment will be described. Note that FIG. 9 is a flow chart showing the operational flow of the navigation device according to the present embodiment.

Figure 9:
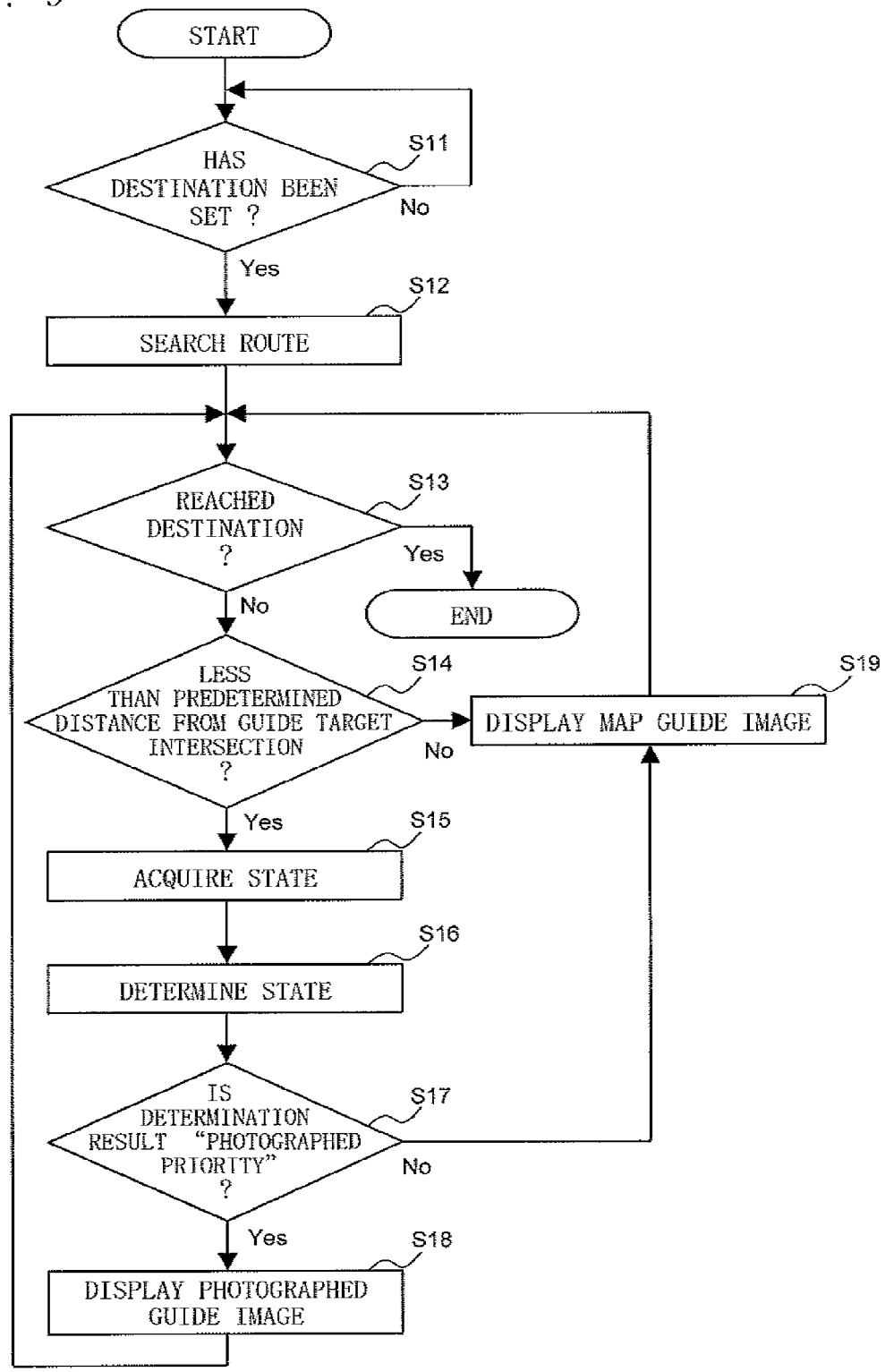
FIG. 9 is a flow chart showing the operational flow of the navigation device according to the first embodiment.

Referring to FIG. 9, it is determined whether or not the user has inputted a destination through the input section 4 and the destination has been set (step S11). When it is determined that the destination has been set ("Yes" in step S11), the position determination section 2 detects the current position of the vehicle and the route search section 7 searches for an optimal route from the current position to the destination (step S12). Further, when a route guide starts, the position determination section 2 detects the current position of the vehicle at predetermined time intervals. Then, it is determined, by checking the current position of the vehicle against the optimal route, whether or not the vehicle has reached the destination (step S13). When it is determined that the vehicle has not reached the destination ("No" in step S13), the process proceeds to step S14. On the other hand, it is determined that the vehicle has reached the destination ("Yes" in step S13), the process ends.

Next, in step S14, the control section 6 determines whether or not the distance from the vehicle to the guide target intersection is less than a predetermined distance (e.g., 200 m). When it is determined that the distance from the vehicle to the guide target intersection is not less than a predetermined distance ("No" in step S14), the process proceeds to step S19. On the other hand, it is determined that the distance from the vehicle to the guide target intersection is less than a predetermined distance ("Yes" in step S14), the process proceeds to step S15. In step S15, the state acquisition section 10 acquires the states outside the vehicle.

Next, the states outside the vehicle acquired by the state acquisition section 10 will be described in detail. First, the case described is where the state acquisition section 10 acquires the degree of blocking caused by an obstacle such as a forward vehicle in the photographed image of the captured forward direction of the vehicle, as a state outside the vehicle. The state acquisition section 10 detects a region (herein after referred to as a forward vehicle region) in which an obstacle such as a forward vehicle is displayed, and then calculates the area of the detected region as the degree of blocking.

Here, as a method of detecting the forward vehicle region, either a well-known method using a monocular camera or that using a stereo camera may be used in the present embodiment. For example, a vehicle detecting method using a monocular camera may include, for example, a method of referring to a luminance value (a method of acquiring the luminance value on a lane and detecting an obstacle on a road surface), a method using a projection transformation image (a method of obtaining the difference between two frames of the projection transformation image and detecting a moving object), and a method of detecting the edge of the forward vehicle (a method of detecting horizontal and vertical edges and detecting an obstacle). Further, a vehicle detecting method using a stereo camera may include, for example, a method of extracting the outline of the forward vehicle from a range image, a method of detecting an object having height information, using stereo back projection transformation, and a method of extracting a road planar region and detecting an obstacle on a road surface. Furthermore, as another vehicle detecting method, it is also possible to detect the forward vehicle by storing road image data, captured when the forward vehicle is not present, in storage means, not shown in the figures, in association with position information in advance, and thus obtaining, based on the position determination result of the position determination section 2, the difference between the photographed image acquired by the video acquisition section 1 and the road image data corresponding to the current traveling position.

Figure 10:
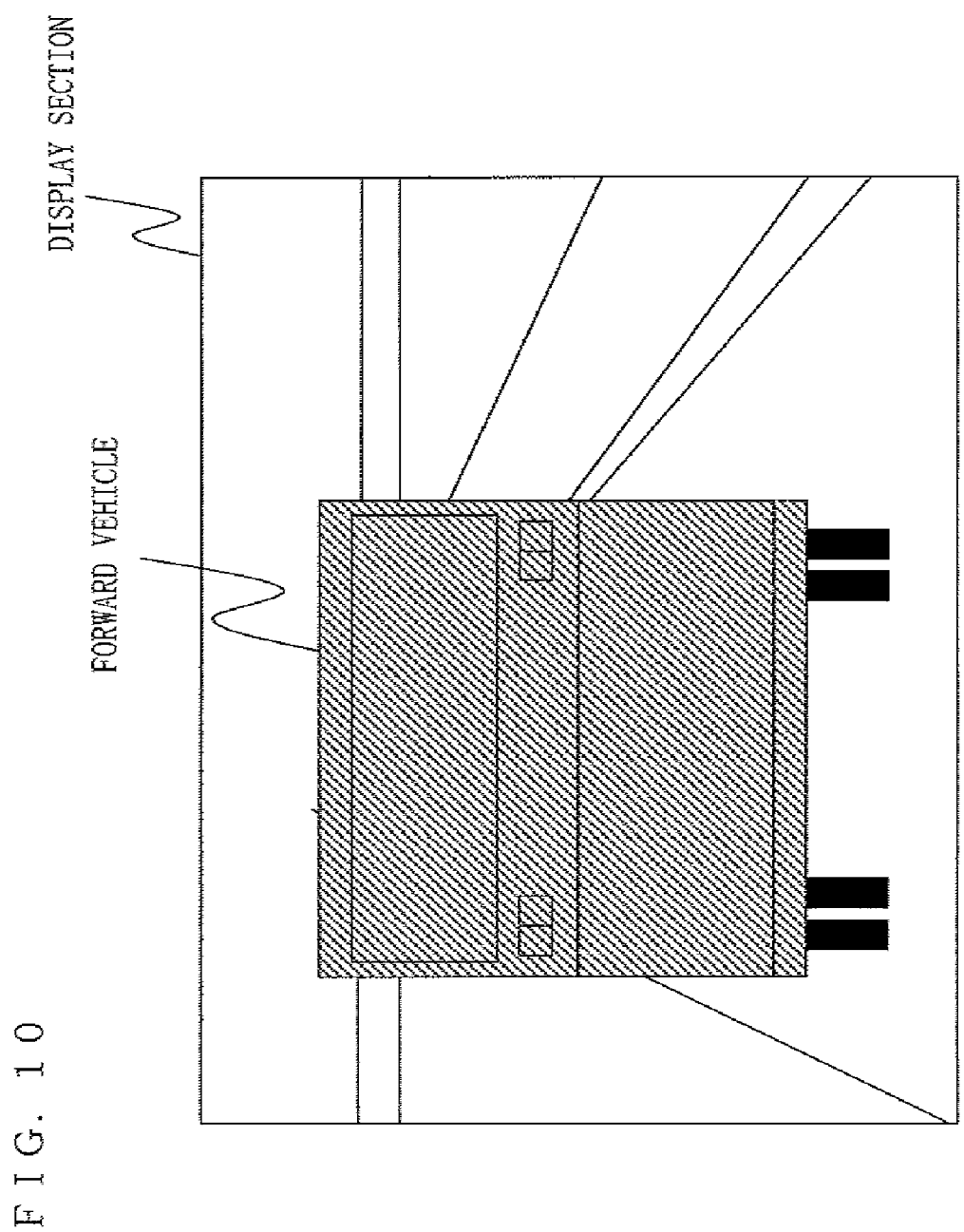
FIG. 10 is a diagram showing the degree of blocking caused by an obstacle such as a forward vehicle in a photographed image of the captured forward direction of the vehicle.

By the above-described method, the forward vehicle region is detected based on the photographed image acquired by the video acquisition section 1. Specifically, referring to FIG. 10, a region represented by diagonal lines is the detected forward vehicle region. Note that FIG. 10 is a diagram illustrating the degree of blocking caused by an obstacle such as a forward vehicle in the photographed image of the captured forward direction of the vehicle. Further, the state acquisition section 10 calculates the area of the detected forward vehicle region and acquires the calculated area as the degree of blocking caused by an obstacle such as a forward vehicle in the photographed image of the captured forward direction of the vehicle. Note that when a plurality of forward vehicle regions are present in the photographed image of the captured forward direction of the vehicle, the sum of the areas of the plurality of forward vehicle regions may be calculated and the calculated sum of the areas may be acquired as the degree of blocking.

Figure 11A:
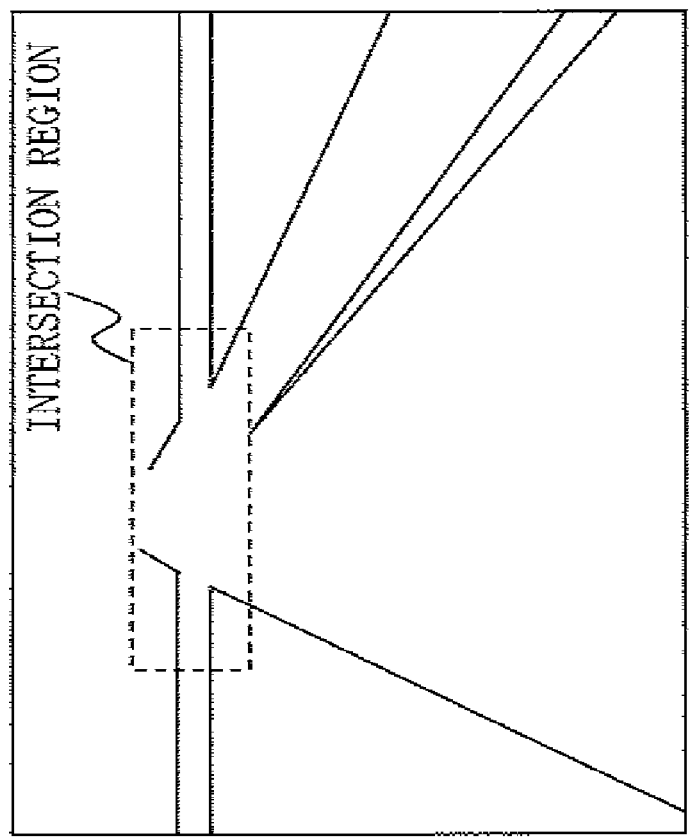
FIG. 11A is a diagram illustrating an intersection region.
Figure 11B:
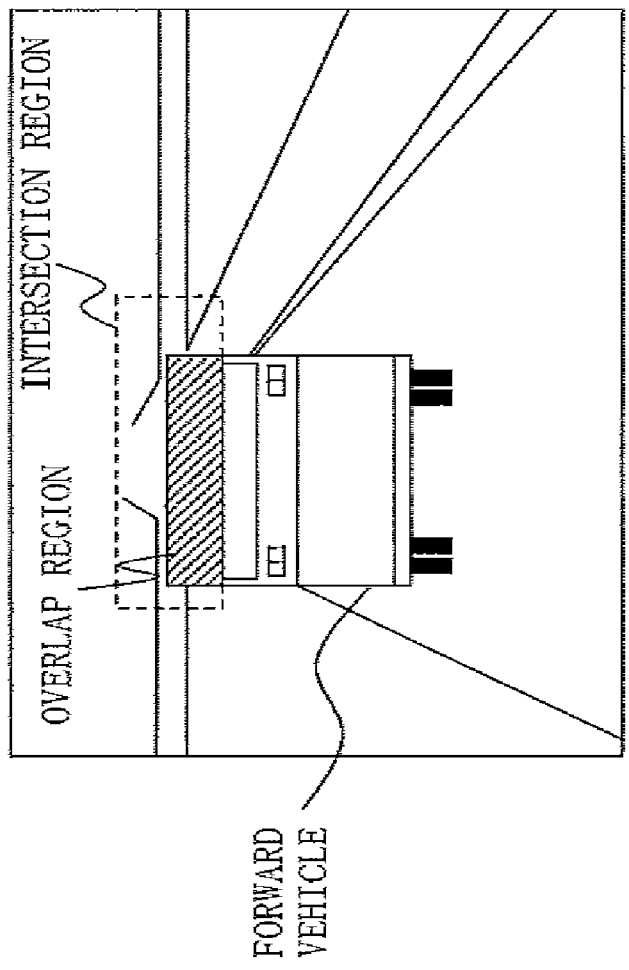
FIG. 11B is a diagram illustrating an overlap region and the method of obtaining the overlap region.
Figure 11C:
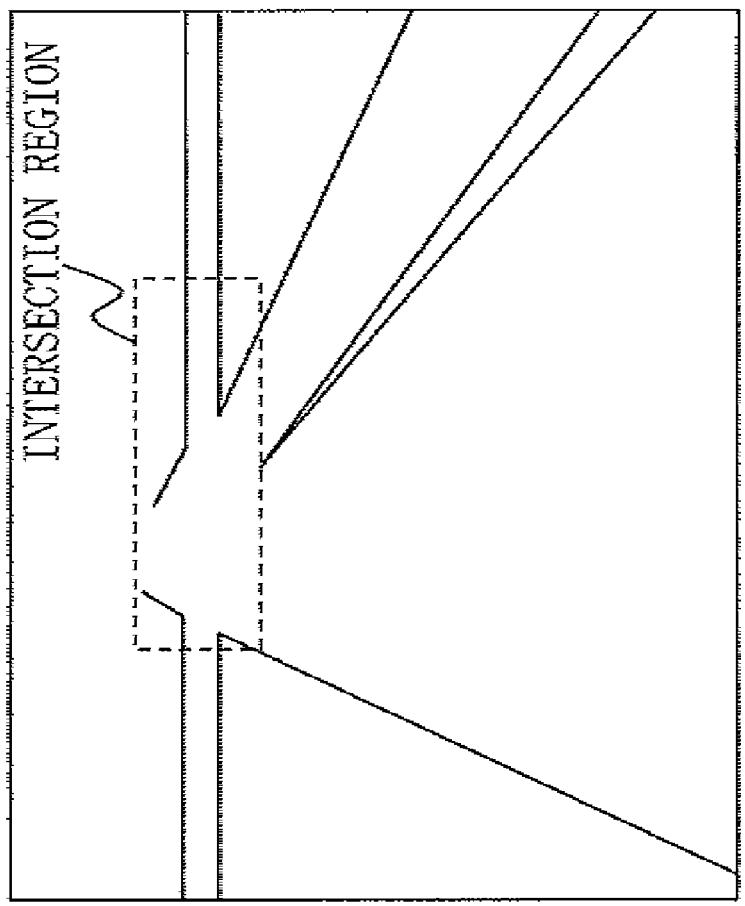
FIG. 11C is a diagram illustrating the intersection region to be set when the vehicle turns right at a guide target intersection.

In the photographed image of the captured forward direction of the vehicle, the state acquisition section 10 may detect, within a region (herein after referred to as an intersection region) in which the guide target intersection is displayed, a region (herein after referred to as an overlap region) overlapping the forward vehicle region, and may acquire the proportion of the overlap region to the intersection region, as the degree of blocking. Here, as shown in FIG. 11A, the intersection region is a region surrounded by a dashed line, including the guide target intersection and a predetermined range around the guide target intersection. Further, the state acquisition section 10 detects the forward vehicle region by the above-described method and then detects the overlap region between the intersection region and the forward vehicle region (see FIG. 11B). Consequently, the state acquisition section 10 acquires the proportion of the overlap region to the intersection region, as the degree of blocking. Furthermore, the greater the overlap (i.e., the overlap region) between the intersection region and the forward vehicle region, the greater the degree of blocking. Note that when the intersection region is set, the position of the predetermined range around the intersection region may be changed in accordance with the direction for the vehicle to travel from the guide target intersection. For example, when the vehicle is to turn right at the guide target intersection, the intersection region is set to include more of the right side of the guide target intersection (see FIG. 11C).

The state acquisition section 10 acquires, as a state outside the vehicle, the determination of the presence or absence of the guide target intersection on the route searched for in the photographed image of the captured forward direction of the vehicle. The presence or absence of the guide target intersection in the photographed image of the captured forward direction of the vehicle is determined by the following method. First, the guide target intersection on the route searched for is detected with reference to the current position of the vehicle detected by the position determination section 2, and also to the map information stored in the map DB 3. Next, the camera view volume (the capture range), similar to that obtained in step S1 of FIG. 4, is obtained, and the presence or absence of the guide target intersection in the camera view volume in the three-dimensional map is determined.

Figure 12A:
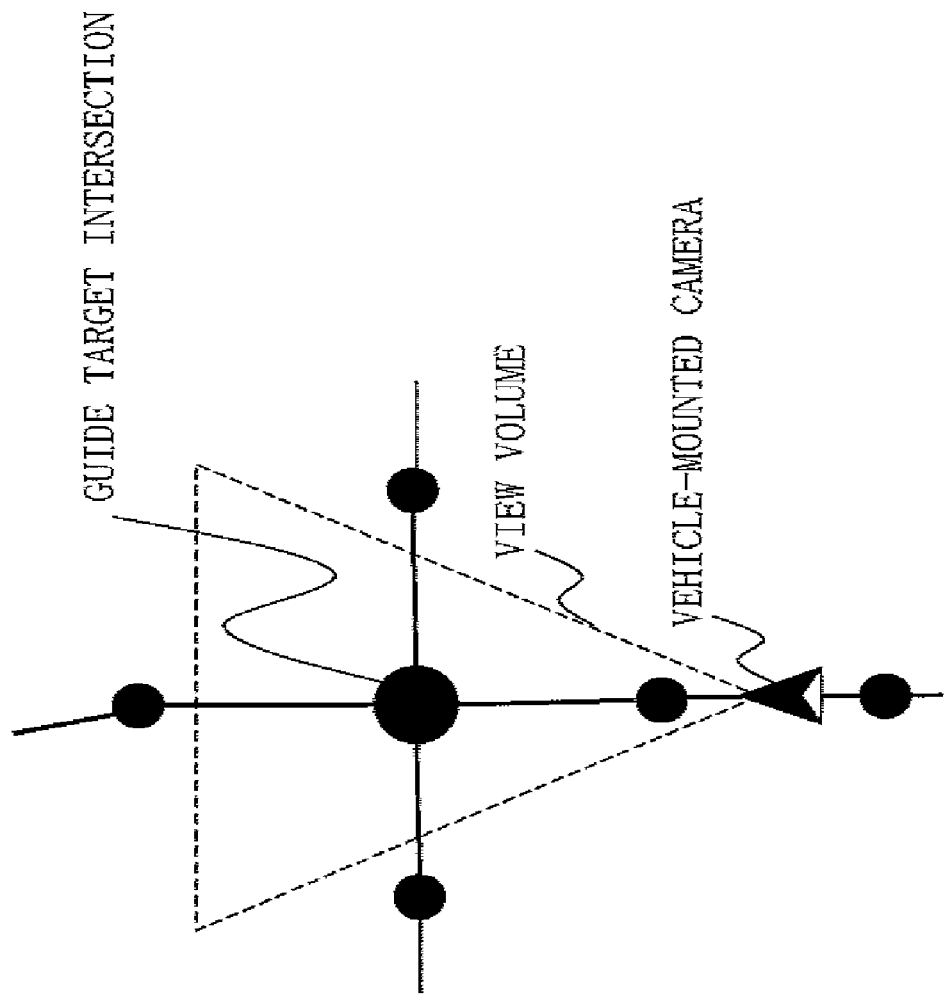
FIG. 12A is a diagram showing an example of a structure composed of nodes, links, and an icon indicating the position of a vehicle-mounted camera, with the use of the node data, the interpolation node data, and the link data, and also showing the camera view volume, directed in the forward direction of the vehicle and viewed from above, in the case where the guide target intersection is present in the capture range of the vehicle-mounted camera.
Figure 12B:
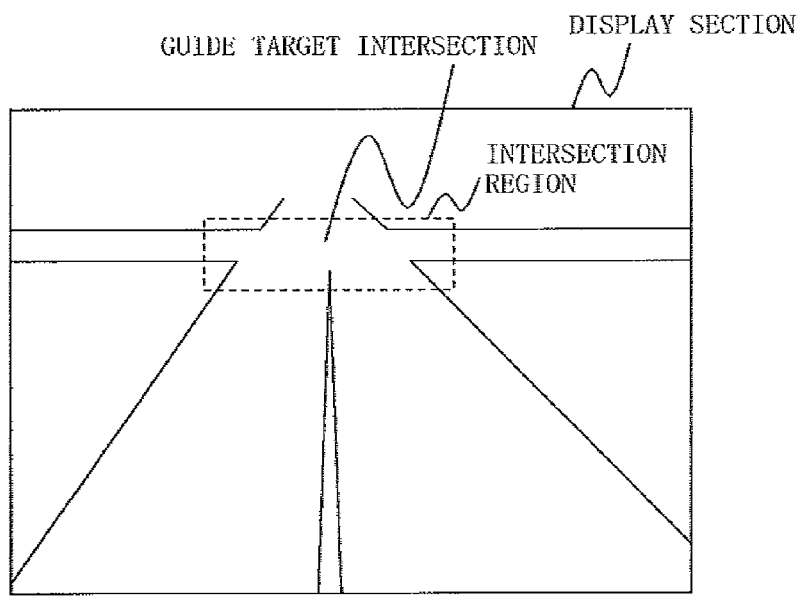
FIG. 12B is a display example of the photographed image in the case where the guide target intersection is present in the camera view volume.

Specifically, FIG. 12A is a diagram showing an example of a structure composed of nodes, links, and an icon indicating the position of a vehicle-mounted camera, with the use of the node data, the interpolation node data, and the link data, and also showing the camera view volume, directed in the forward direction of the vehicle and viewed from above. Note that the present embodiment is described using a diagram including links, nodes, and the like, instead of the three-dimensional map. The case provided is where the detected guide target intersection is present in the camera view volume. Therefore, as shown in FIG. 12B, since the whole or part of the intersection region of the detected guide target intersection is displayed in the photographed image, the state acquisition section 10 acquires the determination of the presence of the detected guide target intersection in the photographed image of the captured forward direction of the vehicle. Note that the intersection region is a region including the guide target intersection and the predetermined range around the guide target intersection that are described above.

Figure 13A:
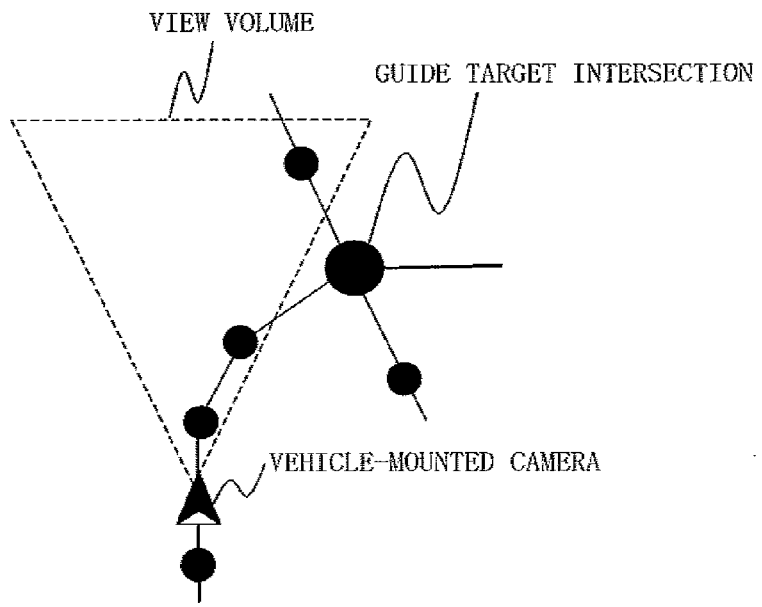
FIG. 13A is a diagram showing an example of a structure composed of nodes, links, and an icon indicating the position of the vehicle-mounted camera, with the use of the node data, the interpolation node data, and the link data, and also showing the camera view volume, directed in the forward direction of the vehicle and viewed from above, in the case where the guide target intersection is absent in the capture range of the vehicle-mounted camera.

On the other hand, FIG. 13A is a diagram showing an example of a structure composed of nodes, links, and an icon indicating the position of the vehicle-mounted camera, with the use of the node data, the interpolation node data, and the link data, and also showing the camera view volume, directed in the forward direction of the vehicle and viewed from above.

Figure 13B:
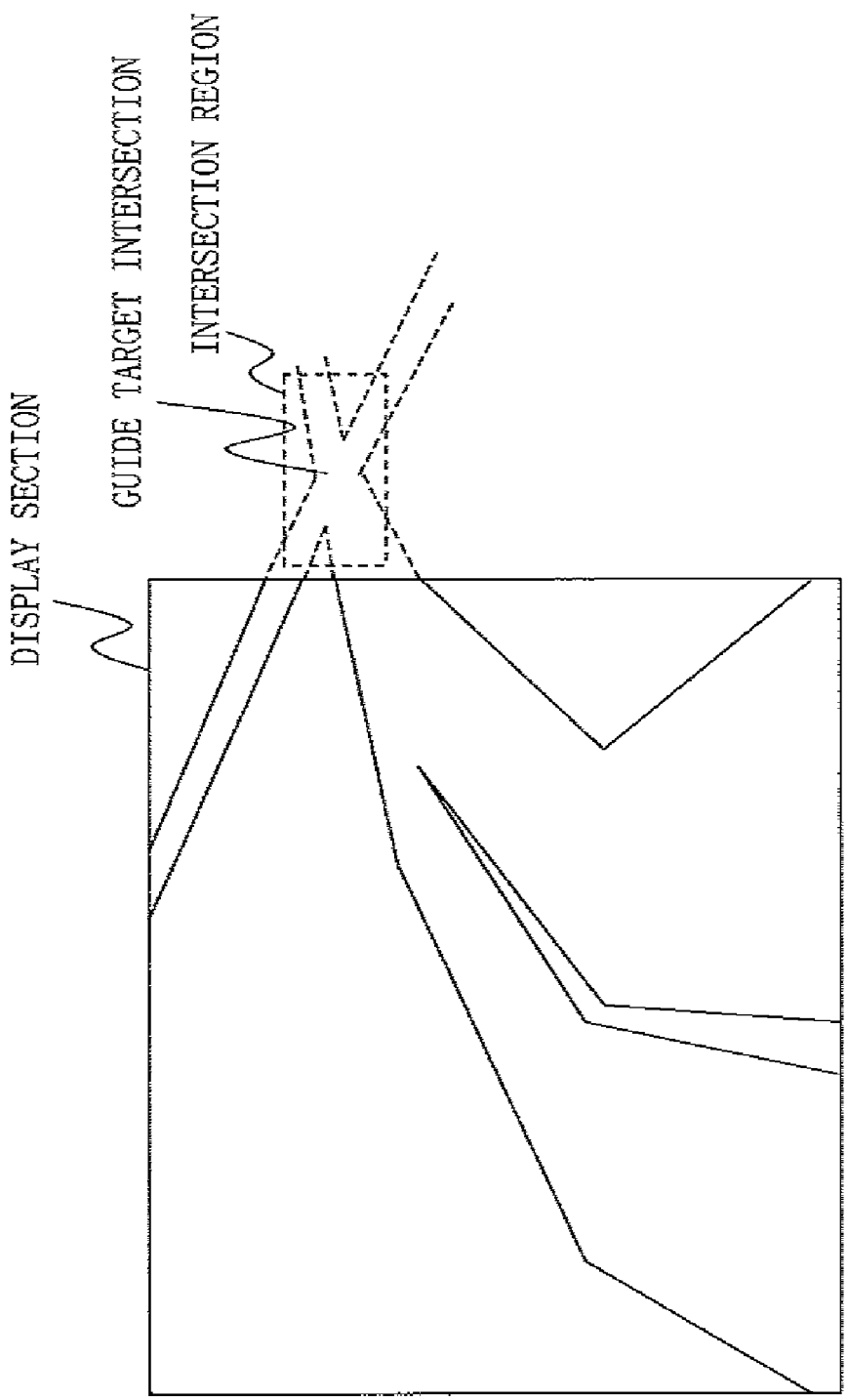
FIG. 13B is a display example of the photographed image in the case where the guide target intersection is absent in the camera view volume.

The case provided is where the detected guide target intersection is absent in the camera view volume. For example, the road in the forward direction of the vehicle curves or slopes insomuch that the detected guide target intersection is present outside the photographed image of the captured forward direction of the vehicle. Therefore, as shown in FIG. 13B, since the whole or part of the intersection region of the detected guide target intersection is not displayed in the photographed image, the state acquisition section 10 acquires the determination of the absence of the guide target intersection in the photographed image of the captured forward direction of the vehicle.

The state acquisition section 10 also acquires the brightness outside the vehicle as a state outside the vehicle. The brightness outside the vehicle is acquired by an illuminance sensor, not shown in the figures. Further, the brightness outside the vehicle may be acquired with reference to the correspondence between the time and the brightness, which is stored in a database, not shown in the figures. Still further, the brightness outside the vehicle may be acquired by detecting, with reference to the map information stored in the map DB 3, that the vehicle is traveling through a tunnel, and by taking the detection result into account. Furthermore, the brightness outside the vehicle may be acquired based on the luminance of the photographed image acquired by the video acquisition section 1.

The state acquisition section 10 also acquires information regarding the weather such as precipitation and/or fog, as a state outside the vehicle. The presence or absence of precipitation may be acquired by, for example, detecting the motion of windshield wipers. Further, the presence or absence of the occurrence of fog may be acquired by calculating the luminance of the photographed image acquired by the video acquisition section 1, and by determining whether or not the whole of the photographed image is white. Note that the presence or absence of precipitation, or of the occurrence of fog, may be appropriately downloaded from a traffic information center via communication means, not shown in the figures.

Referring back to FIG. 9, in step S16, the state determination section 11 determines, with respect to each of the plurality of states outside the vehicle acquired by the state acquisition section 10, which one of the photographed guide image and the map guide image is to be displayed by priority. Note that FIGS. 14A and 14B are each an example of the determination condition and the determination result of each of the plurality of states outside the vehicle acquired by the state acquisition section 10.

Here, with reference to FIGS. 14A and 14B, the method of the state determination section 11 determining each of the plurality of states outside the vehicle and the determination result will be described. As for the degree of blocking caused by an obstacle such as a forward vehicle in the photographed image of the captured forward direction of the vehicle, when the degree of blocking is less than a threshold, the state determination section 11 determines that the photographed guide image is to be displayed by priority (herein after referred to as "Photographed Priority") (see FIG. 14A). In this case, the photographed guide image is effective since it is possible to clearly view the forward direction of the vehicle in the photographed image. On the other hand, when the degree of blocking is more than the threshold, the state determination section 11 determines that the map guide image is to be displayed by priority (herein after referred to as "Map Priority") (see FIG. 14B). In this case, the photographed guide image is not effective since it is impossible to view the forward direction of the vehicle in the photographed image due to an obstacle such as a forward vehicle.

As for the presence or absence of the guide target intersection in the photographed image of the captured forward direction of the vehicle, when the guide target intersection is present in the photographed image of the captured forward direction of the vehicle, the state determination section 11 determines "Photographed Priority". In this case, the photographed guide image is effective since the guide target intersection is displayed in the photographed image. On the other hand, when the guide target intersection is absent in the photographed image of the captured forward direction of the vehicle, the state determination section 11 determines "MapPriority". In this case, the photographed guide image is not effective since the guide target intersection is not displayed in the photographed image.

As for the brightness outside the vehicle, when the brightness outside the vehicle is more than a threshold, the state determination section 11 determines "Photographed Priority", since the photographed guide image is effective. On the other hand, when the brightness outside the vehicle is less than the threshold, such as at night or in a tunnel, the state determination section 11 determines "Map Priority", since the photographed guide image is not effective.

As for the weather such as precipitation and/or fog, when neither precipitation nor fog is present, the state determination section 11 determines "Photographed Priority", since the photographed guide image is effective. On the other hand, when precipitation and/or fog are present, the state determination section 11 determines "Map Priority", since the photographed guide image is not effective. Note that the determination condition of precipitation may not be the presence or absence of precipitation, and may be whether or not the amount of precipitation per unit of time is more than a threshold. In this case, the amount of precipitation may be calculated by detecting the operation speed of the windshield wipers.

Next, in step S17 of FIG. 9, based on the determination result of each of the four states outside the vehicle: the degree of blocking caused by an obstacle such as a forward vehicle in the photographed image of the captured forward direction of the vehicle; the presence or absence of the guide target intersection in the photographed image of the captured forward direction of the vehicle; the brightness outside the vehicle; and the weather such as precipitation, the guide display control section 12 controls which one of the photographed guide image and the map guide image is to be displayed by priority. When the determinations of the four states outside the vehicle, made by the state determination section 11, are all "Photographed Priority" ("Yes" in step S17), the guide display control section 12 controls the photographed guide image to be displayed by priority, and the process proceeds to step S18. In step S18, the photographed guide image is displayed in the display section 5. Specifically, since the determination results of the four states outside the vehicle are all "Photographed Priority" as shown in FIG. 14A, the guide display control section 12 allows the photographed guide image generated by the photographed guide generation section 9 to be displayed in the display section 5. On the other hand, when at least one of the determination results of the four states outside the vehicle is "Map Priority" ("No" in step S17), the guide display control section 12 controls the map guide image to be displayed by priority, and the process proceeds to step S19. In step S19, the map guide image is displayed in the display section 5.

In the states outside the vehicle shown in FIG. 14A, when, for example, a truck approaches the vehicle in the forward direction of the vehicle whereby the degree of blocking caused by an obstacle such as a forward vehicle in the photographed image of the captured forward direction of the vehicle exceeds a threshold, as for the degree of blocking caused by an obstacle such as a forward vehicle in the photographed image of the captured forward direction of the vehicle, the state determination section 11 determines "Map Priority" (see FIG. 14B). Consequently, since one of the determination results becomes "Map Priority", the guide display control section 12 controls the map guide image to be displayed by priority in step S17. As a result, the guide image displayed in the display section 5 is automatically switched, by priority, to the map guide image generated by the map guide generation section 8.

FIG. 15 is a diagram showing an example of the determination condition, the determination result, and the weighted points of each of the plurality of states outside the vehicle acquired by the state acquisition section 10, and total points. As shown in FIG. 15, a weighted point may be set for each of the states outside the vehicle. Consequently, based on the determinations made by the state determination section 11, the set weighted point is added to either one of the photographed guide image and the map guide image, and therefore the guide display control section 12 allows the one having obtained more points to be displayed in the display section 5. Specifically, as shown in FIG. 15, since, for example, the total point of the photographed guide image is 50 and the total point of the map guide image is 30, the guide display control section 12 allows the photographed guide image to be displayed by priority in the display section 5. Note that another method may be used to display either one of the photographed guide image and the map guide image.

Note that the guide display control section 12 may control which one of the photographed guide image and the map guide image is to be played by priority, not based on the combination of the above-described four states outside the vehicle, but based on, for example, the combination of any of the states outside the vehicle or based only on any one of the states outside the vehicle. Further, another state outside the vehicle may be used, besides the above-described four states outside the vehicle.

With the use of, for example, radar, the state acquisition section 10 may acquire the distance from the vehicle to the forward vehicle, as a state outside the vehicle. In this case, the determination condition for switching the guide image is whether or not the distance from the vehicle to a forward vehicle is more than a threshold. Consequently, when the measured distance is more than the threshold, the state determination section 11 determines "Photographed Priority". On the other hand, when the measured distance is less than the threshold, the state determination section 11 determines "Map Priority".

The state acquisition section 10 may acquire an attribute of the road being traveled by the vehicle, such as the road width or the road type (e.g., a main road, a minor street, etc.). In this case, the determination condition for switching the guide image is the acquired attribute of the road. Consequently, when the acquired attribute of the road is a main road, regarding which high-visibility three-dimensional CG (Computer Graphics) data is present in the map DB 3, the state determination section 11 determines "Map Priority". On the other hand, when the acquired attribute of the road is a minor street, regarding which high-visibility three-dimensional CG data is not present in the map DB 3, the state determination section 11 determines "Photographed Priority". Further, the attribute of the road being traveled by the vehicle may be acquired from the map information stored in the map DB 3 or may be acquired from the photographed image acquired by the video acquisition section 1.

The state acquisition section 10 may acquire a marker guide object around the guide target intersection. Here, the marker guide object may be traffic lights, a landmark such as a convenience store or a family restaurant, and the like. In this case, the determination condition for switching the guide image is whether or not the marker guide object is present around the guide target intersection. Consequently, when the marker guide object is present around the guide target intersection, it is possible to display the map guide image having the landmark superimposed thereon, and therefore the state determination section 11 determines "Map Guide Priority". On the other hand, when the marker guide object is not present, the state determination section 11 determines "Photographed Priority". Further, the marker guide object may be acquired from the map DB 3 or may be detected and acquired from the photographed image acquired by the video acquisition section 1.

When the vehicle is traveling a rough road (a road having an uneven surface), the state acquisition section 10 may acquire the amplitude of vibration of the vehicle-mounted camera, using a gyro or the like. In this case, the determination condition for switching the guide image is whether or not the acquired amplitude of vibration is more than a threshold. Consequently, when the amplitude of vibration is more than the threshold, the state determination section 11 determines "Map Priority", since the visibility of the photographed guide image is reduced due to the vibration. On the other hand, when the amplitude of vibration is less than the threshold, the state determination section 11 determines "Photographed Priority", since the visibility of the photographed guide image has no problems.

In the present embodiment, either one of the photographed guide image and the map guide image is displayed by priority in accordance with the states outside the vehicle, but the guide display control section 12 may allow two screens of the photographed guide image and the map guide image to display in the display section 5. For example, in accordance with the states outside the vehicle, either one may be highlighted while the other may be displayed on the edge of the display screen. Note that FIG. 16 is a display example showing a state where the guide display control section 12 allows the photographed guide image to be displayed by priority (step S18 of FIG. 9, for example) and the map guide image to be displayed in another screen.

Figure 16:
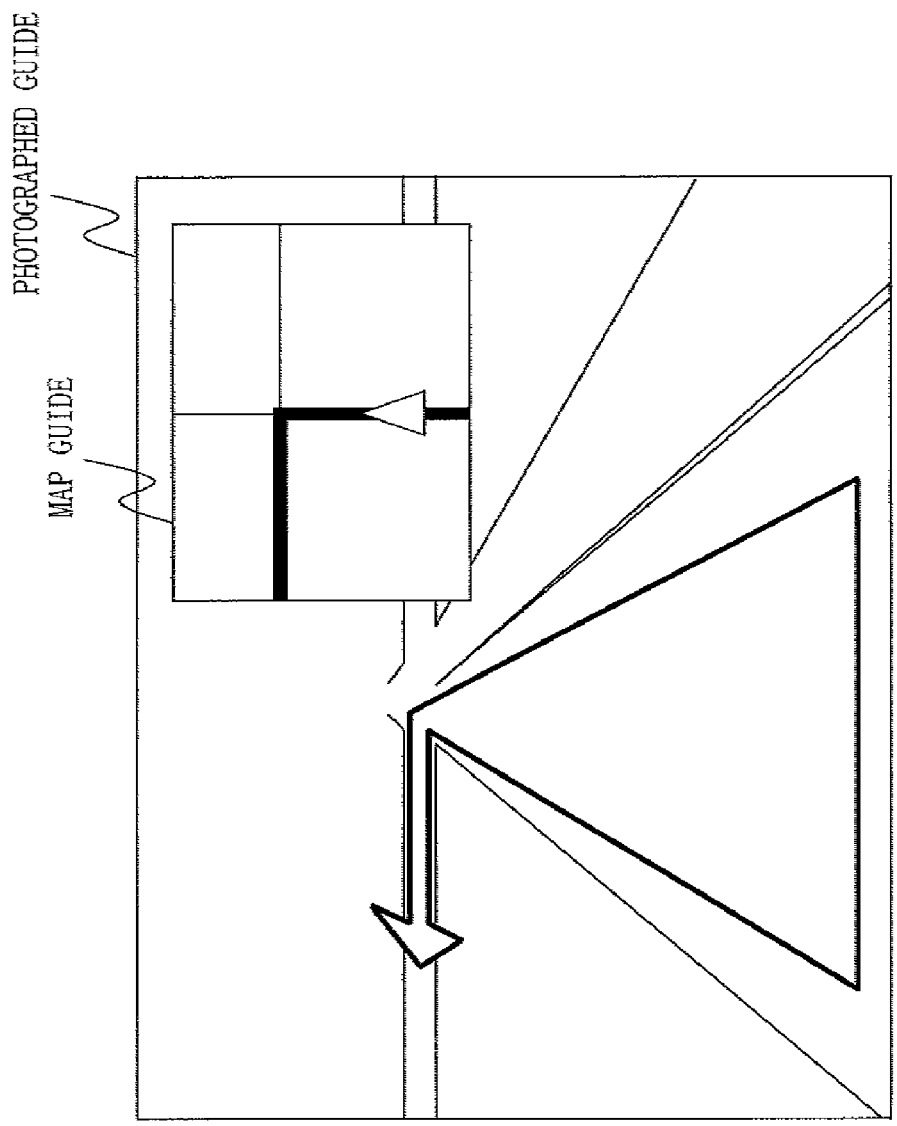
FIG. 16 is a display example showing a state where the photographed guide image and the map guide image according to the first embodiment are simultaneously displayed.

As shown in FIG. 16, since the photographed guide image is highlighted, the photographed guide image is displayed in a relatively large screen and the map guide image is displayed in a relatively small screen. On the other hand, when the guide display control section 12 allows the map guide image to be displayed by priority (step S19 of FIG. 9, for example), since the map guide image is highlighted, the map guide image is displayed in a relatively large screen and the photographed guide image is displayed in a relatively small screen. As a result, in accordance with the states outside the vehicle, either one of the photographed guide image and the map guide image is displayed larger than the other, whereby the user can comprehend the direction for the vehicle to travel from the guide target intersection on the route, and the route searched for.

As described above, the navigation device according to the present embodiment controls, in accordance with the states outside the vehicle, which one of the map guide image and the photographed guide image is to be displayed by priority. Consequently, it is possible to automatically switch the guide image and display the guide image having high visibility in accordance with the states outside the vehicle, without the user performing a switch operation.

Note that in the present invention, the state determination section 11 determines, with respect to each of the plurality of states outside the vehicle acquired by the state acquisition section 10, which one of the photographed guide image and the map guide image is to be displayed by priority, but the guide display control section 12 may make the determination. For example, when the number of the states outside the vehicle acquired by the state acquisition section 10 is one, either one of the state determination section 11 and the guide display control section 12 may make the determination.

In the present invention, when the distance to the guide target intersection becomes less than the predetermined distance, the guide figure indicating the direction for the vehicle to travel is displayed. However, instead of displaying the guide figure, an audio output section, not shown in the figures, may notify the user by voice guidance that the vehicle is approaching the guide target intersection. Further, as well as displaying the guide figure indicating the direction for the vehicle to travel, the audio output section may notify the user by voice guidance that the vehicle is approaching the guide target intersection. For example, voice guidance such as "Turn left 200 meters ahead." may be outputted. Furthermore, when the distance from the vehicle position to the guide target intersection becomes a predetermined distance, voice guidance may be outputted from the audio output section. For example, voice guidance such as "Leftward direction soon." may be outputted.

Second Embodiment

The navigation device according to the first embodiment controls, in accordance with the states outside the vehicle, which one of the photographed guide image and the map guide image is to be displayed by priority, and automatically switches the guide image. In contrast, to prevent the photographed guide image or the map guide image from frequently switching to the other, a navigation device according to a second embodiment described below can calculate the elapsed time since the guide image has switched last time, and can control, based on the calculated elapsed time, whether or not the guide image being displayed by priority is to switch. Note that the navigation device according to the second embodiment is similar in structure to that according to the first embodiment, and will not be shown in the figures. Further, with reference to FIG. 17, the operational flow of the second embodiment will be described. Note that FIG. 17 is a flow chart showing the operational flow of the navigation device according to the second embodiment.

Figure 17:
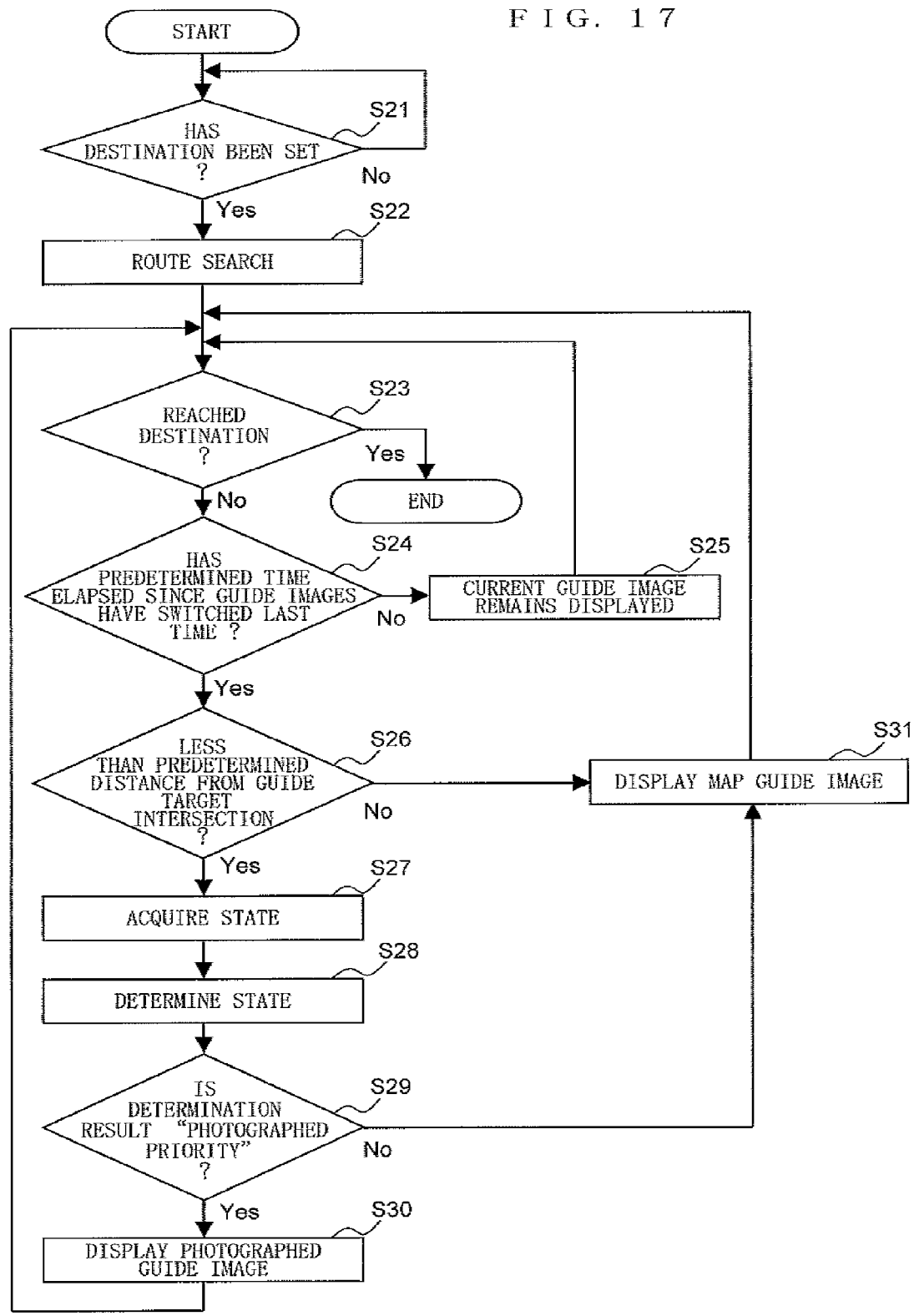
FIG. 17 is a flowchart showing the operational flow of a navigation device according to a second embodiment.

First, referring to FIG. 17, the process performed in steps S21 through S23 is similar to that performed in steps S11 through S13 of FIG. 9. Then, in step S24, the guide display control section 12 determines whether or not a predetermined time has elapsed since the guide image has switched last time. When it is determined that a predetermined time has elapsed since the guide image has switched last time ("Yes" in step S24), the process similar to that performed in steps S14 through S19 of FIG. 9 is performed (steps S26 through S31). On the other hand, when it is determined that a predetermined time has not elapsed since the guide image has switched last time ("No" in step S24), the process proceeds to step S25. In step S25, the guide image currently being displayed by priority does not switch and remains displayed.

As described above, according to the navigation device according to the present embodiment, the guide display control section 12 controls, taking into account the elapsed time since the guide image has switched last time, whether or not the guide image displayed by priority is to switch. Consequently, until the predetermined time has elapsed since the guide image displayed by priority has switched, the guide image displayed by priority no longer switches. As a result, since the guide image does not frequently switch in a section (e.g., away from the guide target intersection) where the user frequently views a guide screen, it is possible to prevent the user from being confused.

Note that in step S24, it is determined whether or not a predetermined time has elapsed since the guide image has switched last time, but alternatively, it may be determined, by calculating the travel distance of the vehicle instead of the elapsed time, whether or not the vehicle has traveled more than a predetermined distance since the guide image has switched last time, thereby controlling whether or not the guide image displayed by priority is to switch. Consequently, until the vehicle has traveled the predetermined distance since the guide image displayed by priority has switched, the guide image displayed by priority no longer switches. Yet alternatively, while the vehicle is traveling a predetermined section, the guide image may no longer switch. For example, less than 50 m away from the guide target intersection, the guide image may not be allowed to switch. As a result, since the guide image does not frequently switch in a section (e.g., away from the guide target intersection) where the user frequently views the guide screen, it is possible to prevent the user from being confused.

Third Embodiment

A navigation device according to a third embodiment can generate the photographed guide image varying in display mode depending on the states outside the vehicle. Here, the display mode is display contents displayed in an image. Further, when the photographed guide image is displayed by priority, the photographed guide image having superimposed thereon the guide figure varying in form depending on the presence or absence of the guide target intersection in the photographed image of the captured forward direction of the vehicle, is generated. Note that the navigation device according to the third embodiment is similar in structure to that according to the first embodiment, and will not be shown in the figures. Further, with reference to FIGS. 18 through 20B, the operational flow of the third embodiment will be described. Note that FIG. 18 is a flow chart showing the operational flow of the navigation device according to the third embodiment.

Figure 18:
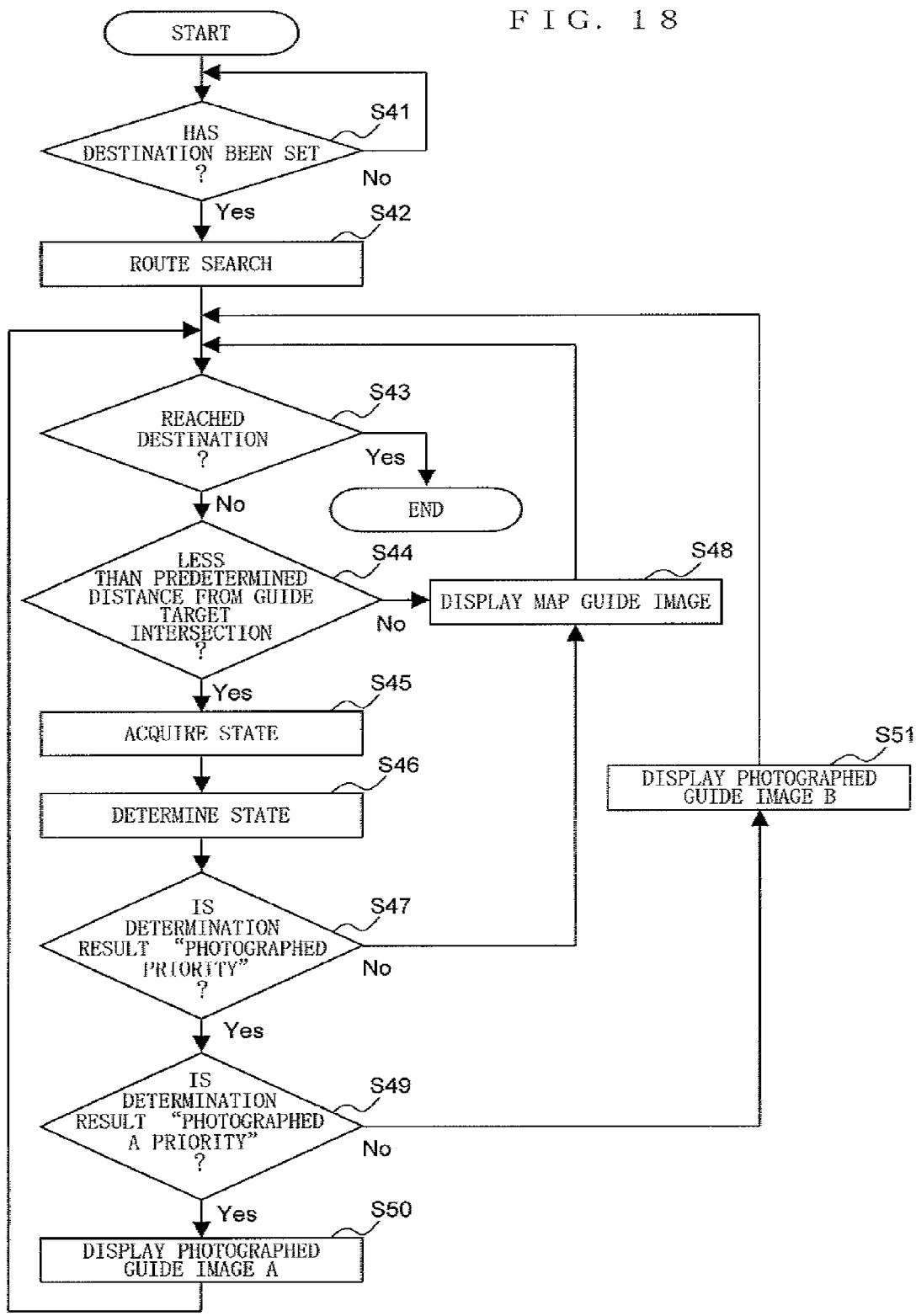
FIG. 18 is a flowchart showing the operational flow of a navigation device according to a third embodiment.

First, referring to FIG. 18, the process performed in steps S41 through S45 is similar to that performed in steps S11 through S15 of FIG. 9. Then, in step S46, the state determination section 11 determines, with respect to each of the plurality of states outside the vehicle acquired by the state acquisition section 10, which one of the photographed guide image and the map guide image is to be displayed by priority. Note that FIG. 19 is a diagram showing an example of the guide images to switch, the determination condition, and the determination result of each of the plurality of states outside the vehicle.

Next, in step S47, based on the determination result of each of the three states outside the vehicle: the degree of blocking caused by an obstacle such as a forward vehicle in the photographed image of the captured forward direction of the vehicle; the brightness outside the vehicle; and the weather such as precipitation, the guide display control section 12 controls which one of the photographed guide image and the map guide image is to be displayed by priority. When the determinations of the three states outside the vehicle, made by the state determination section 11, are all "Photographed Priority" ("Yes" in step S47), the process proceeds to step S49. On the other hand, when at least one of the determination results of the three states outside the vehicle is "Map Priority" ("No" in step S47), the guide display control section 12 controls the map guide image to be displayed by priority, and the process proceeds to step S48. In step S48, the map guide image is displayed in the display section 5.

Next, in step S49, the guide display control section 12 controls which one of the photographed guide images having superimposed thereon the guide figure varying in form depending on the determination, made by the state determination section 11, of the presence or absence of the guide target intersection in the photographed image of the captured forward direction of the vehicle, is to be displayed by priority. Note that the presence or absence of the guide target intersection in the photographed image of the captured forward direction of the vehicle is determined based on whether or not the whole or part of the intersection region of the guide target intersection is present in the photographed image. When it is determined that the guide target intersection is present in the photographed image of the captured forward direction of the vehicle ("Yes" in step S49), the guide display control section 12 controls a photographed guide image A to be displayed by priority, and the process proceeds to step S50. In step S50, the photographed guide image A is displayed in the display section 5 (see FIG. 20A). On the other hand, when it is determined that the guide target intersection is absent in the photographed image of the captured forward direction of the vehicle ("No" in step S49), the guide display control section 12 controls a photographed guide image B to be displayed by priority, and the process proceeds to step S51. In step S51, the photographed guide image B is displayed in the display section 5 (see FIG. 20B). Note that FIGS. 20A and 20B are each a display example of the photographed guide image having superimposed thereon the guide figure varying in form.

Figure 20A:
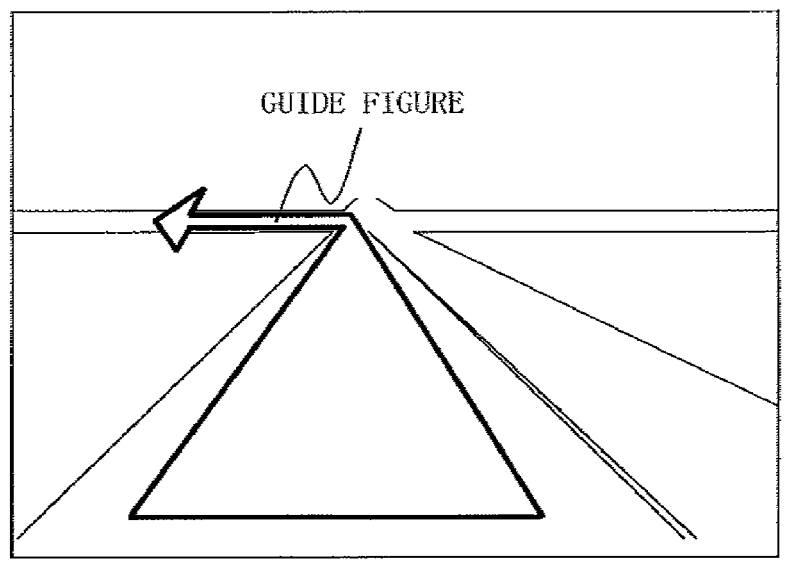
FIG. 20A is a display example of a photographed guide image A according to the third embodiment.
Figure 20B:
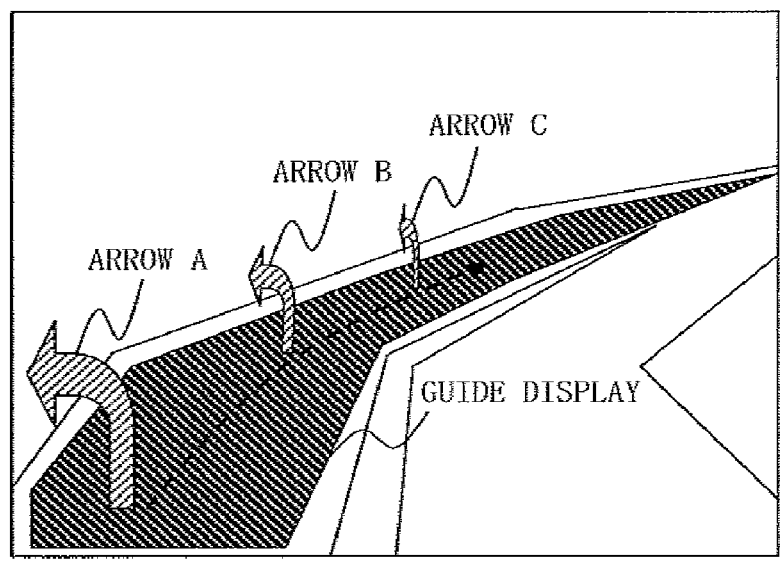
FIG. 20B is a display example of a photographed guide image B according to the third embodiment.

FIG. 20A is a display example of the photographed guide image A, which is displayed by priority when the guide target intersection is present in the photographed image of the captured forward direction of the vehicle. The photographed guide image A, similar to the above-described photographed guide image, is the guide image in which the photographed image has superimposed thereon the guide figure indicating the direction for the vehicle to travel from the guide target intersection. On the other hand, FIG. 20B is a display example of the photographed guide image B, which is displayed by priority when the guide target intersection is absent in the photographed image of the captured forward direction of the vehicle. The photographed guide image B is the guide image in which the guide figure (a guide display) indicating the direction for the vehicle to travel to the guide target intersection is superimposed along a road in the photographed image and the guide figures indicating the direction for the vehicle to travel from the guide target intersection are superimposed as arrows (an arrow A, an arrow B, and an arrow C) that are different from the guide display.

As described above, according to the navigation device according to the present embodiment, when the photographed guide image is displayed by priority in accordance with the states outside the vehicle, it is also possible to generate the photographed guide image having superimposed thereon the guide figure varying in form depending on the presence or absence of the guide target intersection in the photographed image of the captured forward direction of the vehicle. Consequently, even when the guide target intersection is absent in the photographed image of the captured forward direction of the vehicle, it is possible to display the photographed guide image having high visibility and using the photographed image for allowing the user to intuitively confirm the situation.

Note that the display mode of the photographed guide image is not limited to the present embodiment. Further, in the present embodiment, the case described is where the photographed guide image is combined with the map guide image, but only the photographed guide image may be displayed and the guide figure in the photographed guide image may be changed in accordance with the states outside the vehicle. Furthermore, the present embodiment may be combined with the example, described in the first embodiment, of simultaneously displaying two screens, or may be combined with the second embodiment.

While the invention has been described in detail, the foregoing description is in all aspects illustrative and not restrictive. It is to be understood that numerous other modifications and variations can be devised without departing from the scope of the invention.

INDUSTRIAL APPLICABILITY

The navigation device according to the present invention is useful for a car navigation device installed in a vehicle or a navigation device of a mobile terminal such as a mobile phone.

The invention claimed is:

1. A navigation device comprising:
   a display section for displaying a guide image indicating a guide to a destination;
   a state acquisition section for acquiring a state outside a vehicle;
   a photographed guide generation section for generating a photographed guide image, using a photographed image of a captured forward direction of the vehicle;
   a map guide generation section for generating a map guide image, using map information;
   a state determination section for, based on the state outside the vehicle acquired by the state acquisition section, determining which one of the photographed guide image and the map guide image is to be displayed by priority; and
   a guide display control section for, based on the determination made by the state determination section, allowing the guide image including at least one of the photographed guide image and the map guide image to be displayed in the display section,
   wherein the state acquisition section acquires a plurality of the states outside the vehicle, and
   wherein, when the state determination section determines, based on at least one of the states outside the vehicle acquired by the state acquisition section, that the map guide image is to be displayed by priority, the guide display control section allows the map guide image to be displayed by priority.

2. A navigation device comprising:
   a display section for displaying a guide image indicating a guide to a destination;
   a state acquisition section for acquiring a state outside a vehicle;
   a photographed guide generation section for generating a photographed guide image, using a photographed image of a captured forward direction of the vehicle;
   a map guide generation section for generating a map guide image, using map information;

a state determination section for, based on the state outside the vehicle acquired by the state acquisition section, determining which one of the photographed guide image and the map guide image is to be displayed by priority; and a guide display control section for, based on the determination made by the state determination section, allowing the guide image including at least one of the photographed guide image and the map guide image to be displayed in the display section, wherein, until a predetermined time has elapsed since the guide image displayed by priority has switched, the guide display control section no longer switches the guide image displayed by priority.

3. A navigation device comprising:

a display section for displaying a guide image indicating a guide to a destination;

a state acquisition section for acquiring a state outside a vehicle;

a photographed guide generation section for generating a photographed guide image, using a photographed image of a captured forward direction of the vehicle;

a map guide generation section for generating a map guide image, using map information;

a state determination section for, based on the state outside the vehicle acquired by the state acquisition section, determining which one of the photographed guide image and the map guide image is to be displayed by priority; and a guide display control section for, based on the determination made by the state determination section, allowing the guide image including at least one of the photographed guide image and the map guide image to be displayed in the display section, wherein, until the vehicle has traveled a predetermined distance since the guide image displayed by priority has switched, the guide display control section no longer switches the guide image displayed by priority.

4. A navigation device comprising:

a display section for displaying a guide image indicating a guide to a destination;

a state acquisition section for acquiring a state outside a vehicle;

a photographed guide generation section for generating a photographed guide image, using a photographed image of a captured forward direction of the vehicle;

a map guide generation section for generating a map guide image, using map information;

a state determination section for, based on the state outside the vehicle acquired by the state acquisition section, determining which one of the photographed guide image and the map guide image is to be displayed by priority; and a guide display control section for, based on the determination made by the state determination section, allowing the guide image including at least one of the photographed guide image and the map guide image to be displayed in the display section, wherein, while the vehicle is traveling a predetermined section, the guide display control section no longer switches the guide image displayed by priority.

5. A navigation device comprising:

a display section for displaying a guide image indicating a guide to a destination;

a state acquisition section for acquiring a state outside a vehicle;

a photographed guide generation section for generating a photographed guide image, using a photographed image of a captured forward direction of the vehicle;

a map guide generation section for generating a map guide image, using map information;

a state determination section for, based on the state outside the vehicle acquired by the state acquisition section, determining which one of the photographed guide image and the map guide image is to be displayed by priority; and a guide display control section for, based on the determination made by the state determination section, allowing the guide image including at least one of the photographed guide image and the map guide image to be displayed in the display section, wherein the state acquisition section includes a degree-of-blocking calculation section for calculating a degree of blocking caused by an obstacle in the forward direction of the vehicle in the photographed image, and wherein, based on the degree of blocking calculated by the degree-of-blocking calculation section, the state determination section determines which one of the photographed guide image and the map guide image is to be displayed by priority.

6. The navigation device according to claim 5, wherein the state determination section (i) determines, when the degree of blocking calculated by the degree-of-blocking calculation section is less than a threshold, that the photographed guide image is to be displayed by priority, and (ii) determines, when the degree of blocking calculated by the degree-of-blocking calculation section is more than the threshold, that the map guide image is to be displayed by priority.

7. The navigation device according to claim 5, wherein the degree-of-blocking calculation section calculates, in the photographed image, a proportion of a region overlapping the obstacle in the forward direction to an intersection region which is a region in which a guide target intersection is displayed, as the degree of blocking.

8. A navigation device comprising:

a display section for displaying a guide image indicating a guide to a destination;

a state acquisition section for acquiring a state outside a vehicle;

a photographed guide generation section for generating a photographed guide image, using a photographed image of a captured forward direction of the vehicle;

a map guide generation section for generating a map guide image, using map information;

a state determination section for, based on the state outside the vehicle acquired by the state acquisition section, determining which one of the photographed guide image and the map guide image is to be displayed by priority; and a guide display control section for, based on the determination made by the state determination section, allowing the guide image including at least one of the photographed guide image and the map guide image to be displayed in the display section, wherein the state acquisition section includes a guide target intersection determination section for determining whether or not a whole or part of an intersection region which is a region in which a guide target intersection is displayed is present in the photographed image, and wherein, based on the determination made by the guide target intersection determination section, the state determination section determines which one of the photographed guide image and the map guide image is to be displayed by priority.

9. The navigation device according to claim 8,
wherein the state determination section (i) determines, when the guide target intersection determination section determines that the whole or part of the intersection region is present in the photographed image, that the photographed guide image is to be displayed by priority, and (ii) determines, when the guide target intersection determination section determines that the whole or part of the intersection region is not present in the photographed image, that the map guide image is to be displayed by priority.

10. A navigation device comprising:
a display section for displaying a guide image indicating a guide to a destination;
a state acquisition section for acquiring a state outside a vehicle;
a photographed guide generation section for generating a photographed guide image, using a photographed image of a captured forward direction of the vehicle;
a map guide generation section for generating a map guide image, using map information;
a state determination section for, based on the state outside the vehicle acquired by the state acquisition section, determining which one of the photographed guide image and the map guide image is to be displayed by priority; and
a guide display control section for, based on the determination made by the state determination section, allowing the guide image including at least one of the photographed guide image and the map guide image to be displayed in the display section,
wherein the state acquisition section includes a brightness acquisition section for acquiring a brightness outside the vehicle, and
wherein, based on the brightness acquired by the brightness acquisition section, the state determination section determines which one of the photographed guide image and the map guide image is to be displayed by priority.

11. The navigation device according to claim 10,
wherein the state determination section (i) determines, when the brightness acquired by the brightness acquisition section is more than a threshold, that the photographed guide image is to be displayed by priority, and (ii) determines, when the brightness acquired by the brightness acquisition section is less than the threshold, that the map guide image is to be displayed by priority.

12. A navigation device comprising:
a display section for displaying a guide image indicating a guide to a destination;
a state acquisition section for acquiring a state outside a vehicle;
a photographed guide generation section for generating a photographed guide image, using a photographed image of a captured forward direction of the vehicle;
a map guide generation section for generating a map guide image, using map information;
a state determination section for, based on the state outside the vehicle acquired by the state acquisition section, determining which one of the photographed guide image and the map guide image is to be displayed by priority; and
a guide display control section for, based on the determination made by the state determination section, allowing the guide image including at least one of the photographed guide image and the map guide image to be displayed in the display section,
wherein the state acquisition section includes a precipitation detection section for detecting precipitation outside the vehicle, and
wherein, based on the detection result of the precipitation detection section, the state determination section determines which one of the photographed guide image and the map guide image is to be displayed by priority.

13. The navigation device according to claim 12,
wherein the state determination section (i) determines, when the precipitation detection section does not detect precipitation, that the photographed guide image is to be displayed by priority, and (ii) determines, when the precipitation detection section detects precipitation, that the map guide image is to be displayed by priority.

14. A navigation device comprising:
a display section for displaying a guide image indicating a guide to a destination;
a state acquisition section for acquiring a state outside a vehicle;
a photographed guide generation section for generating a photographed guide image, using a photographed image of a captured forward direction of the vehicle;
a map guide generation section for generating a map guide image, using map information;
a state determination section for, based on the state outside the vehicle acquired by the state acquisition section, determining which one of the photographed guide image and the map guide image is to be displayed by priority; and
a guide display control section for, based on the determination made by the state determination section, allowing the guide image including at least one of the photographed guide image and the map guide image to be displayed in the display section,
wherein the state acquisition section includes a fog detection section for detecting fog outside the vehicle, and
wherein, based on the detection result of the fog detection section, the state determination section determines which one of the photographed guide image and the map guide image is to be displayed by priority.

15. The navigation device according to claim 14,
wherein the state determination section (i) determines, when the fog detection section does not detect fog, that the photographed guide image is to be displayed by priority, and (ii) also determines, when the fog detection section detects fog, that the map guide image is to be displayed by priority.

16. A navigation device comprising:
a display section for displaying a guide image indicating a guide to a destination;
a state acquisition section for acquiring a state outside a vehicle;
a photographed guide generation section for generating a photographed guide image, using a photographed image of a captured forward direction of the vehicle;
a map guide generation section for generating a map guide image, using map information;
a state determination section for, based on the state outside the vehicle acquired by the state acquisition section, determining which one of the photographed guide image and the map guide image is to be displayed by priority; and
a guide display control section for, based on the determination made by the state determination section, allowing the guide image including at least one of the photographed guide image and the map guide image to be displayed in the display section, wherein the state acquisition section includes a distance measurement section for measuring a distance to a forward vehicle, and wherein, based on the distance measured by the distance measurement section, the state determination section determines which one of the photographed guide image and the map guide image is to be displayed by priority.

17. The navigation device according to claim 16, wherein the state determination section (i) determines, when the distance measured by the distance measurement section is more than a threshold, that the photographed guide image is to be displayed by priority, and (ii) determines, when the distance measured by the distance measurement section is less than the threshold, that the map guide image is to be displayed by priority.

18. A navigation device comprising:

a display section for displaying a guide image indicating a guide to a destination;

a state acquisition section for acquiring a state outside a vehicle;

a photographed guide generation section for generating a photographed guide image, using a photographed image of a captured forward direction of the vehicle;

a map guide generation section for generating a map guide image, using map information;

a state determination section for, based on the state outside the vehicle acquired by the state acquisition section, determining which one of the photographed guide image and the map guide image is to be displayed by priority; and a guide display control section for, based on the determination made by the state determination section, allowing the guide image including at least one of the photographed guide image and the map guide image to be displayed in the display section, wherein the state acquisition section includes a vibration detection section for detecting a vibration of a capture section for capturing the forward direction of the vehicle, and wherein, based on the detection result of the vibration detection section, the state determination section determines which one of the photographed guide image and the map guide image is to be displayed by priority.

19. The navigation device according to claim 18, wherein the state determination section (i) determines, when an amplitude of the vibration detected by the vibration detection section is less than a threshold, that the photographed guide image is to be displayed by priority, and (ii) determines, when the amplitude of the vibration detected by the vibration detection section is more than the threshold, that the map guide image is to be displayed by priority.

20. A navigation device comprising:

a display section for displaying a guide image indicating a guide to a destination;

a state acquisition section for acquiring a state outside a vehicle;

a photographed guide generation section for generating a photographed guide image, using a photographed image of a captured forward direction of the vehicle;

a map guide generation section for generating a map guide image, using map information;

a state determination section for, based on the state outside the vehicle acquired by the state acquisition section, determining which one of the photographed guide image and the map guide image is to be displayed by priority; and a guide display control section for, based on the determination made by the state determination section, allowing the guide image including at least one of the photographed guide image and the map guide image to be displayed in the display section, wherein the state acquisition section includes a road attribute acquisition section for acquiring an attribute of a road being traveled, and wherein, based on the attribute acquired by the road attribute acquisition section, the state determination section determines which one of the photographed guide image and the map guide image is to be displayed by priority.

21. A navigation device comprising:

a display section for displaying a guide image indicating a guide to a destination;

a state acquisition section for acquiring a state outside a vehicle;

a photographed guide generation section for generating a photographed guide image, using a photographed image of a captured forward direction of the vehicle;

a map guide generation section for generating a map guide image, using map information;

a state determination section for, based on the state outside the vehicle acquired by the state acquisition section, determining which one of the photographed guide image and the map guide image is to be displayed by priority; and a guide display control section for, based on the determination made by the state determination section, allowing the guide image including at least one of the photographed guide image and the map guide image to be displayed in the display section, wherein the state acquisition section includes a guide object detection section for detecting a marker guide object around a guide target intersection, and wherein, based on the detection result of the guide object detection section, the state determination section determines which one of the photographed guide image and the map guide image is to be displayed by priority.

22. A navigation device comprising:

a display section for displaying a guide image indicating a guide to a destination;

a state acquisition section for acquiring a state outside a vehicle;

a photographed guide generation section for generating a photographed guide image, using a photographed image of a captured forward direction of the vehicle;

a map guide generation section for generating a map guide image, using map information;

a state determination section for, based on the state outside the vehicle acquired by the state acquisition section, determining which one of the photographed guide image and the map guide image is to be displayed by priority; and a guide display control section for, based on the determination made by the state determination section, allowing the guide image including at least one of the photographed guide image and the map guide image to be displayed in the display section, wherein the state acquisition section includes a guide target intersection determination section for determining whether or not a whole or part of an intersection region which is a region in which a guide target intersection is displayed is present in the photographed image, and wherein the photographed guide generation section generates the photographed guide image by superimposing, on the photographed image, a guide figure varying in form depending on the determination made by the guide target intersection determination section.

23. A navigation method comprising:

a state acquisition step of acquiring a state outside a vehicle;

a photographed guide generation step of generating a photographed guide image, using a photographed image of a captured forward direction of the vehicle;

a map guide generation step of generating a map guide image, using map information;

a state determination step of, based on the state outside the vehicle acquired in the state acquisition step, determining which one of the photographed guide image and the map guide image is to be displayed by priority; and a guide display control step of, based on the determination made in the state determination step, allowing a guide image including at least one of the photographed guide image and the map guide image to be displayed.

* * * * *